US006967644B1

(12) United States Patent
Kobayashi

(10) Patent No.: US 6,967,644 B1
(45) Date of Patent: Nov. 22, 2005

(54) COORDINATE INPUT APPARATUS AND CONTROL METHOD THEREOF, AND COMPUTER READABLE MEMORY

(75) Inventor: Kiwamu Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/406,868

(22) Filed: Sep. 28, 1999

(30) Foreign Application Priority Data

| Oct. 1, 1998 | (JP) | ................................. 10-280146 |
| Jul. 29, 1999 | (JP) | ................................. 11-215742 |
| Jul. 29, 1999 | (JP) | ................................. 11-215746 |
| Aug. 23, 1999 | (JP) | ................................. 11-235414 |

(51) Int. Cl.$^7$ .............................................. G09G 5/08

(52) U.S. Cl. .................. 345/158; 345/157; 348/211.99

(58) Field of Search ................................. 345/156–158, 345/163; 348/211, 212, 213, 214, 725, 728, 348/211.99; 250/206.1, 201.7

(56) References Cited

U.S. PATENT DOCUMENTS

| 5,146,353 | A | * | 9/1992 | Isoguchi et al. ............. 348/211 |
| 5,512,920 | A | * | 4/1996 | Gibson ........................ 345/163 |
| 5,619,231 | A | * | 4/1997 | Shouen ........................ 345/163 |
| 5,694,153 | A | * | 12/1997 | Aoyagi et al. ............... 345/156 |
| 5,703,623 | A | * | 12/1997 | Hall et al. .................... 345/156 |
| 5,781,229 | A | * | 7/1998 | Zediker et al. ........... 250/206.1 |
| 5,867,146 | A | * | 2/1999 | Kim et al. ................... 345/158 |
| 5,900,927 | A | * | 5/1999 | Hasegawa ................. 250/201.7 |
| 5,999,167 | A | * | 12/1999 | Marsh et al. ................ 345/158 |
| 6,115,028 | A | * | 9/2000 | Balakrishnan et al. ...... 345/157 |

* cited by examiner

Primary Examiner—Amr A. Awad
(74) Attorney, Agent, or Firm—Morgan & Finnegan, L.L.P.

(57) ABSTRACT

A coordinate input apparatus comprising: a designation device having a light emission device for designating a three-dimensional position; and a photoreception unit having a plurality of line sensors for receiving light emitted by the light emission device and determining the three-dimensional position of the light emission device. Based on the determined value obtained by the photoreception unit, three-dimensional coordinates of the position of the designation device are calculated by a microcomputer.

32 Claims, 34 Drawing Sheets

COORDINATE INPUT APPARATUS AND CONTROL METHOD THEREOF, AND COMPUTER READABLE MEMORY

BACKGROUND OF THE INVENTION

The present invention relates to a coordinate input apparatus for inputting three-dimensional coordinates or two-dimensional coordinates and a control method thereof, and a computer readable memory.

A conventional system handling three-dimensional coordinates, e.g., three-dimensional CAD, three-dimensional layout tools, three-dimensional motion games, three-dimensional motion measurement devices or the like, or a coordinate input apparatus serving as an application software, is realized by the following methods:

(1) A method utilizing a sensor supported by a multiarticulated mechanism to detect the three dimensional position of a coordinate-inputting object by a mechanical contact between the sensor and the object or mechanical deformation;

(2) A method which realizes three-dimensional coordinate input by combination of second-dimensional input operations using a joy stick or the like; and (3) A method which calculates the three-dimensional coordinates by executing computation processing of a stereo-image obtained by a plurality of video cameras or the like, which are capable of sensing visible light or infrared ray.

However, the method (1) of the foregoing conventional coordinate input apparatus is difficult to apply to various usage because of its large mechanism. The method (2) has a disadvantage in that a user is unable to intuitively perform three-dimensional coordinate input and that the three-dimensional coordinate input cannot be realized in real time or continuously. The method (3) has a problem of an excessive amount of operations which impose a heavy load on a CPU of a computer, does not execute real-time processing; and causes a delay in other processing.

Also, proposed as a coordinate input apparatus for inputting two-dimensional coordinates with the use of the coordinate input mechanism of the aforementioned coordinate input apparatus is to input coordinate data designated by an operator with a pointing device to an external apparatus such as a computer or the like.

As such coordinate input apparatus, for instance, a light spot formed on a display screen of a large display by an operator with a pointing device is picked up by a CCD area sensor or a linear sensor, and based on an output signal indicative of the position of the light spot focused in the image sensing surface of the sensor, two-dimensional coordinates of height spot on the display screen are obtained. Alternatively, a plurality of position detection devices which output analog signals corresponding to the position of the light spot are used, and based on the level or rate of analog voltages outputted by the position detection devices, two-dimensional coordinates of the light spot on the display screen are obtained.

Such coordinate input apparatus utilizing a light beam must achieve the following.

(1) To generate a highly precise coordinate value and to enable stable input operation, an influence of disturbance light incident from outside the coordinate input apparatus must be eliminated.

Recently, as the displaying methods are diversified, and the use of infrared ray as a wireless communication means is generalized and a remote controller employing an infrared ray is widely used, many infrared rays are utilized in the environment in which a coordinate input apparatus is used. In order to accurately perform operation of the coordinate input apparatus in such environment, means which assures disturbance light removal is required.

(2) The coordinate input apparatus must have a wide photoreceptive dynamic range.

Generally in the type of coordinate input apparatus which detects a light beam emitted from a pointing device operated by a user, the amount of light emitted from the pointing device fluctuates largely in accordance with how the user operates the pointing device (more specifically, the direction or moving speed of the pointing device or the distance between the pointing device and a sensor). Furthermore, when battery power is used to drive the pointing device, the amount of light emitted from the pointing device largely varies depending on the remaining amount of power in the battery. Therefore, the coordinate input apparatus of this type needs photoreceptive means having a wide dynamic range.

However the foregoing coordinate input apparatus, which detects a light spot on the display screen, only includes an optical filter for filtering light of a particular wavelength band as the means for removing disturbance light. No consideration is given to make the optical detection of the coordinate input apparatus follow the fluctuating amount of light emitted.

Furthermore, also in the case of the aforementioned type of coordinate input apparatus which detects the level or rate of analog voltages outputted by the plurality of position detection devices, the only means provided for removing disturbance light is a filter for filtering light of a particular wavelength band. Since the coordinate input apparatus of this type detects coordinates by using a level of photoreception signal indicative of the amount of light emitted, it is almost impossible to make the optical detection of the coordinate input apparatus follow the fluctuating amount of light emitted.

SUMMARY OF THE INVENTION

The present invention is made in consideration of the above situation, and has as its object to provide a coordinate input apparatus and control method thereof as well as a computer readable memory, for efficient and easy three-dimensional input operations.

To attain the above objects, a coordinate input apparatus according to the present invention has the following configuration.

More specifically, the present invention provides a coordinate input apparatus for inputting three-dimensional coordinates, comprising: designation means, having a light emission device, for designating a three-dimensional position; a plurality of line sensors for receiving light emitted by the light emission device and determining a three-dimensional position where the light emission device exists; and calculation means for calculating three-dimensional coordinates of a position where the designation means exists, based on a determined value obtained by the plurality of line sensors.

Furthermore, to attain the above objects, a control method of a coordinate input apparatus according to the present invention has the following configuration.

More specifically, the present invention provides a control method of a coordinate input apparatus for inputting three-dimensional coordinates, comprising the steps of: inputting a three-dimensional position of a light emission device based on light emission of the light emission device; determining the three-dimensional position where the light emission device exists based on light emitted by the light emission device and received by a plurality of line sensors; and calculating three-dimensional coordinates of the position where the light emission device exists, based on a determined value obtained in the determining step.

Furthermore, to attain the above objects, a computer-readable memory according to the present invention has the following configuration.

More specifically, the present invention provides a computer-readable memory storing program codes for controlling a coordinate input apparatus which inputs three-dimensional coordinates, the memory comprising: program codes for an input step of inputting a three-dimensional position of a light emission device based on light emission of the light emission device; program codes for a determining step of determining the three-dimensional position where the light emission device exists based on light emitted by the light emission device and received by a plurality of line sensors; and program codes for a calculation step of calculating three-dimensional coordinates of the position where the light emission device exists, based on a determined value obtained in the determining step.

Still further, to attain the above objects, a coordinate input apparatus according to the present invention has the following configuration.

More specifically, the present invention provides a coordinate input apparatus for inputting three-dimensional coordinates, comprising: designation means, having a light emission device, for designating a three-dimensional position; a plurality of line sensors for receiving light emitted by the light emission device and determining a three-dimensional position where the light emission device exists; a photoreception device for receiving light emitted by the light emission device; calculation means for calculating three-dimensional coordinates of a position where the designation means exists, based on a determined value obtained by the plurality of line sensors; and synchronization means for synchronizing a light emission cycle of the light emission device with a photoreception cycle of the line sensors based on a signal outputted by the photoreception device.

Furthermore, to attain the above objects, a control method of a coordinate input apparatus according to the present invention has the following configuration.

More specifically, the present invention provides a control method of a coordinate input apparatus for inputting three-dimensional coordinates, comprising the steps of: receiving light, emitted by a designation device having a light emission device, with a plurality of line sensors and determining a three-dimensional position where the light emission device exists; receiving light, emitted by the light emission device, with a photoreception device; calculating three-dimensional coordinates of a position where the light emission device exists, based on a determined value obtained in the determining step; synchronizing a light emission cycle of the light emission device with a photoreception cycle of the line sensors based on a signal outputted by the photoreception device.

Furthermore, to attain the above objects, a computer-readable memory according to the present invention has the following configuration.

More specifically, the present invention provides a computer-readable memory storing program codes for controlling a coordinate input apparatus which inputs three-dimensional coordinates, the memory comprising: program codes for a determining step of receiving light, emitted by a designation device having a light emission device, with a plurality of line sensors and determining a three-dimensional position where the light emission device exists; program codes for a photoreception step of receiving light, emitted by the light emission device, with a photoreception device; program codes for a calculation step of calculating three-dimensional coordinates of a position where the light emission device exists, based on a determined value obtained in the determining step; program codes for a synchronizing step of synchronizing a light emission cycle of the light emission device with a photoreception cycle of the line sensors based on a signal outputted by the photoreception device.

Furthermore, to attain the above objects, a coordinate input apparatus according to the present invention has the following configuration.

More specifically, the present invention provides a coordinate input apparatus for inputting three-dimensional coordinates, comprising: designation means for designating a three-dimensional position, the designation means having a light emission device and a plurality of switches; a plurality of line sensors for receiving light emitted by the light emission device and determining a three-dimensional position where the light emission device exists; a photoreception device for receiving light emitted by the light emission device; binarization means for binarizing an output signal of the photoreception device; calculation means for calculating three-dimensional coordinates of a position where the designation means exists based on a binarized signal outputted by the binarization means and a determined value obtained by the plurality of line sensors.

Furthermore, to attain the above objects, a control method of a coordinate input apparatus according to the present invention has the following configuration.

More specifically, the present invention provides a control method of a coordinate input apparatus for inputting three-dimensional coordinates, comprising the steps of: determining a three-dimensional position where a light emission device exists by receiving light, emitted by a designation device having the light emission device and a plurality of switches, with a plurality of line sensors; receiving light, emitted by the light emission device, with a photoreception device; binarizing an output signal of the photoreception device; and calculating three-dimensional coordinates of a position of the designation device based on a binarized signal outputted in the binarization step and a determined value obtained by the plurality of line sensors.

Furthermore, to attain the above objects, a computer-readable memory according to the present invention has the following configuration.

More specifically, the present invention provides a computer-readable memory storing program codes for controlling a coordinate input apparatus which inputs three-dimensional coordinates, the memory comprising: program codes for a determining step of determining a three-dimensional position where a light emission device exists by receiving light, emitted by a designation device having the light emission device and a plurality of switches, with a plurality of line sensors; program codes for a photoreception step of receiving light, emitted by the light emission device, with a photoreception device; program codes for binarization step of binarizing an output signal of the photoreception device; and program codes for calculation step of calculating three-dimensional coordinates of a position of the designation device based on a binarized signal outputted in the binarization step and a determined value obtained by the plurality of line sensors.

Furthermore, to attain the above objects, a coordinate input apparatus according to the present invention has the following configuration.

More specifically, the present invention provides a coordinate input apparatus for detecting a position of a light spot, generated on a predetermined two-dimensional coordinate surface with light emitted by a designation device which emits light in a predetermined blinking cycle, and for outputting detected coordinate data, the apparatus comprising: a first photoreception sensor for detecting from the light spot, a light emission position in two-dimensional direction; a second photoreception sensor for detecting from the light spot, time series variance of light emitted; synchronization control means for synchronizing detection operation of the first photoreception sensor with the blinking cycle of light in the light spot based on the time series variance of the light spot detected by the second photoreception sensor; and calculation means for calculating coordinates of the position of the light spot, generated on the two-dimensional coordinate surface, based on a signal outputted from the first photoreception sensor brought to a synchronous state by the synchronization control means.

Furthermore, to attain the above objects, a control method of a coordinate input apparatus according to the present invention has the following configuration.

More specifically, the present invention provides a control method of a coordinate input apparatus which detects a position of a light spot, generated on a predetermined two-dimensional coordinate surface with light emitted by a designation device which emits light in a predetermined blinking cycle, and outputs detected coordinate data, the method comprising: a first detection step of detecting from the light spot, a light emission position in two-dimensional direction, by using a first photoreception sensor; a second detection step of detecting from the light spot, time series variance of light emitted, by using a second photoreception sensor; a synchronization control step of synchronizing detection operation of the first photoreception sensor with the blinking cycle of light in the light spot based on the time series variance of the light spot detected by the second photoreception sensor; and a calculation step of calculating coordinates of the position of the light spot, generated on the two-dimensional coordinate surface, based on a signal outputted from the first photoreception sensor brought to a synchronous state in the synchronization control step.

Furthermore, to attain the above objects, a computer-readable memory according to the present invention has the following configuration.

More specifically, the present invention provides a computer-readable memory storing program codes for controlling a coordinate input apparatus which detects a position of a light spot, generated on a predetermined two-dimensional coordinate surface with light emitted by a designation device which emits light in a predetermined blinking cycle, and outputs detected coordinate data, the memory comprising: program codes for a first detection step of detecting from the light spot, a light emission position in two-dimensional direction, by using a first photoreception sensor; program codes for a second detection step of detecting from the light spot, time series variance of light emitted, by using a second photoreception sensor; program codes for a synchronization control step of synchronizing detection operation of the first photoreception sensor with the blinking cycle of light in the light spot based on the time series variance of the light spot detected by the second photoreception sensor; and program codes for a calculation step of calculating coordinates of the position of the light spot, generated on the two-dimensional coordinate surface, based on a signal outputted from the first photoreception sensor brought to a synchronous state in the synchronization control step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
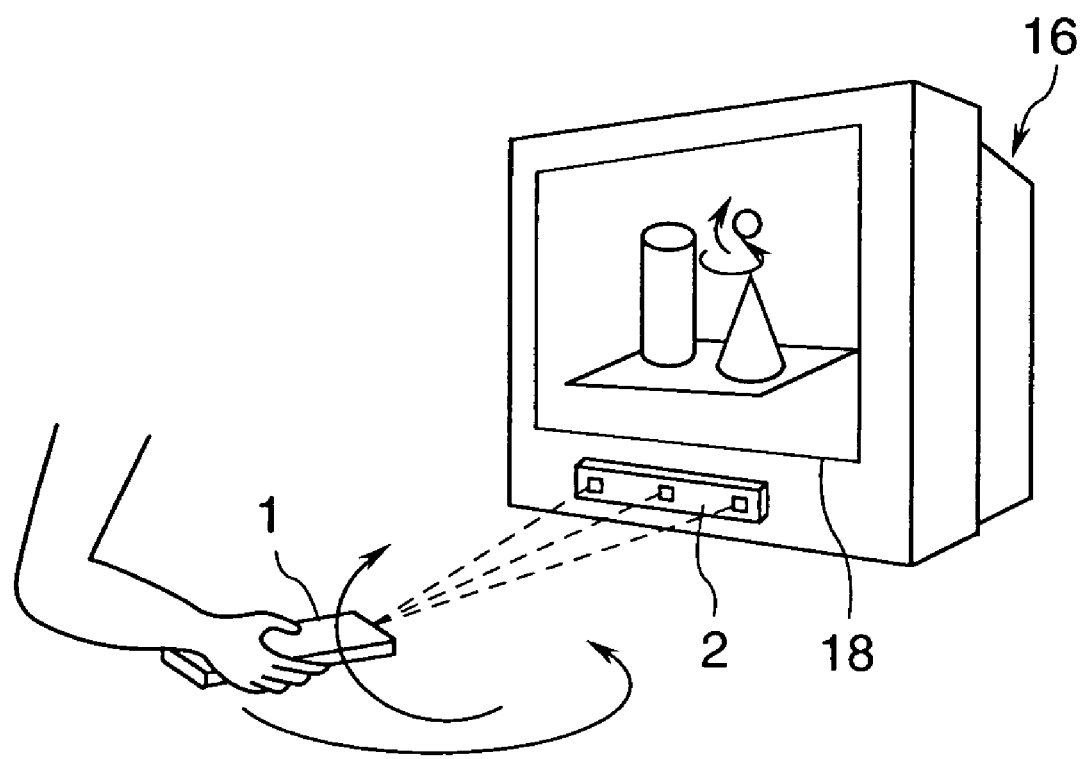
FIG. 1 is an external appearance of a three-dimensional coordinate input apparatus according to a first embodiment of the present invention.

FIG. 1 is an external appearance of a three-dimensional coordinate input apparatus according to the first embodiment of the present invention.

According to the first embodiment, a sensor unit 2 for three-dimensional input is provided below a display device 18 of a computer 16. When a pointing device 1 (designation means), comprising an infrared ray emission device, is pointed in the direction of the sensor unit 2 by a user, a light beam such as an infrared ray is emitted to the sensor unit 2. By this, the position (relative three-dimensional position with respect to the sensor's center) of the pointing device 1, e.g., wireless remote controller or the like, is inputted to the computer 16. Note that the above input operation can be performed in real time.

Next, a construction of the sensor unit 2 is described with reference to FIG. 2.

Figure 2:
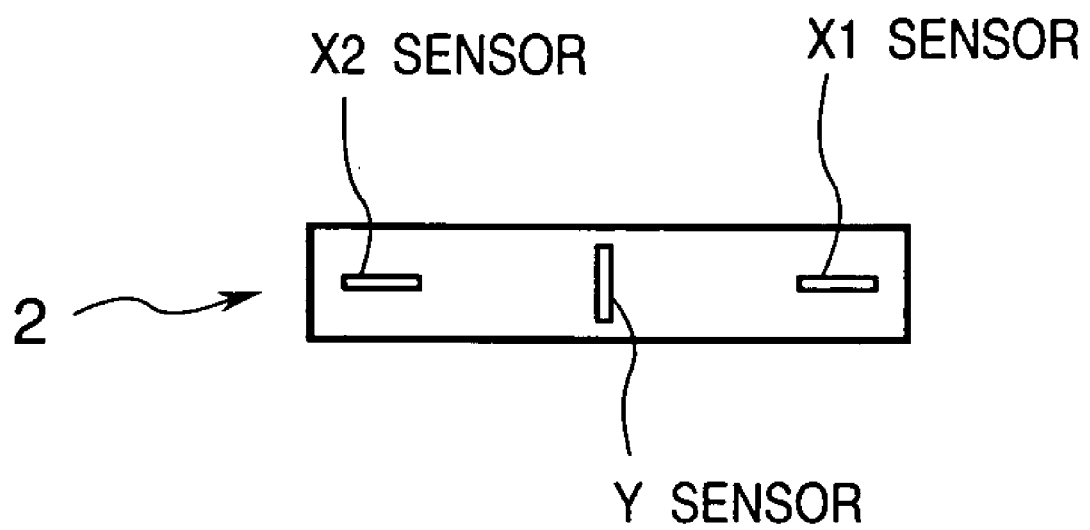
FIG. 2 is an illustration showing a construction of a sensor unit according to the first embodiment of the present invention.

FIG. 2 is an illustration showing a construction of the sensor unit according to the first embodiment of the present invention.

As shown in FIG. 2, the sensor unit 2 has two line sensors (X1 and X2 sensors) in the X-axis direction, and has one sensor (Y sensor) in the Y-axis direction.

Next, the positional relation between the pointing device 1 and sensor unit 2 is described with reference to FIG. 3.

Figure 3:
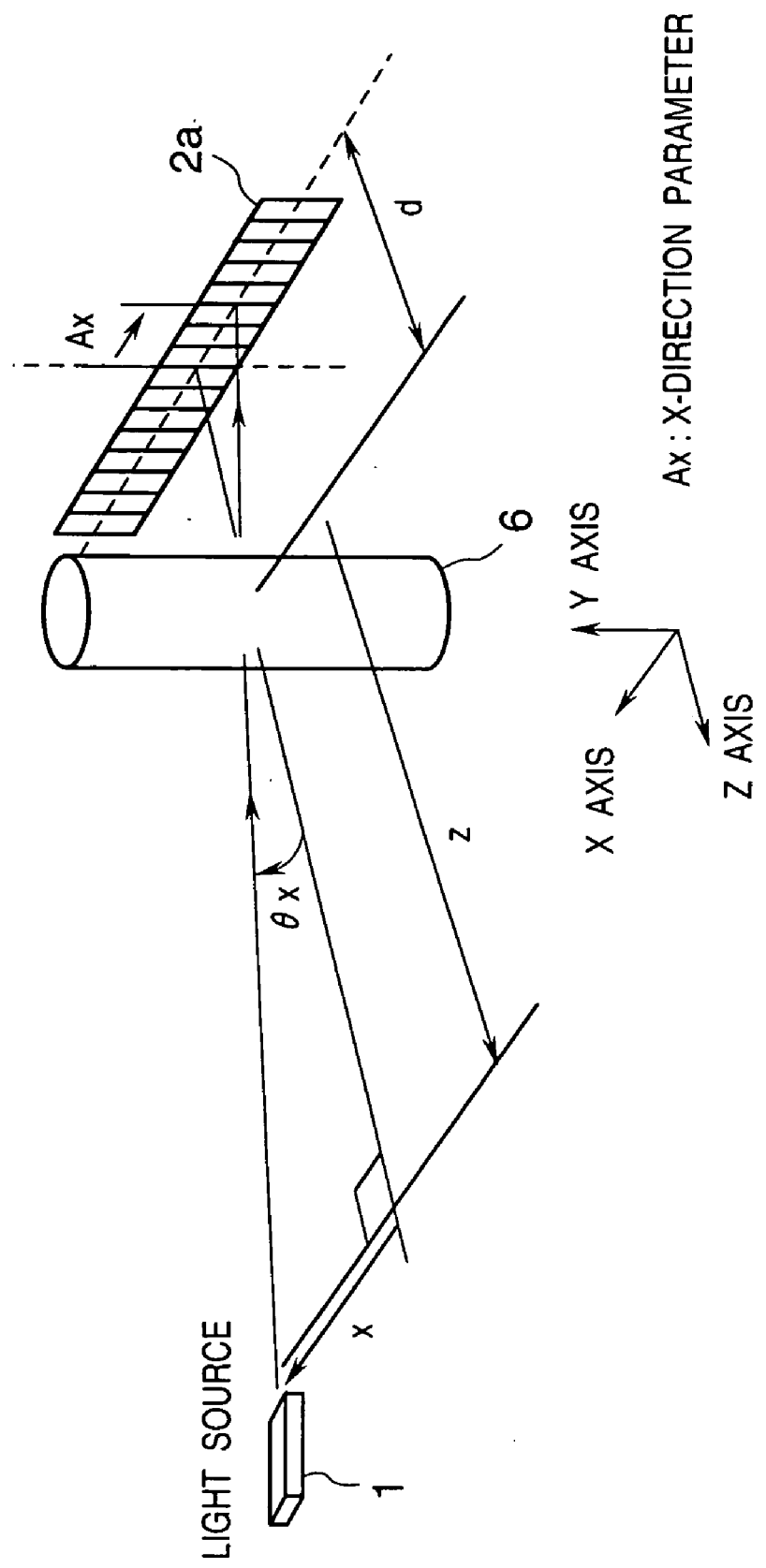
FIG. 3 is an explanatory view showing a positional relation between a pointing device and the sensor unit according to the first embodiment of the present invention.

FIG. 3 is an explanatory view showing a positional relation between the pointing device and sensor unit according to the first embodiment of the present invention. Note that in FIG. 3, particularly the positional relations between the pointing device 1, X1 sensor and a cylindrical lens 6 is described.

As shown in FIG. 3, the center line of the coordinate system penetrates through the center of the cylindrical lens 6 and the center of the X1 sensor. Therefore, in a case where the infrared ray emission device is positioned in the coordinate center, a light beam emitted by the infrared ray emission device is focused in the center of the X1 sensor. In a case where the infrared ray emission device of the pointing device 1 is positioned off the center axis by an angle of $\theta x$ on the XZ surface, a light beam emitted by the infrared ray emission device is focused on the position off the center of the X1 sensor by deviation $Ax$.

Herein, the relation expressed by the following equation (1) stands:

$$Ax = d \times \tan(\theta x) \tag{1}$$

wherein d indicates a distance from the cylindrical lens 6 to the X1 sensor.

Hereinafter, Ax will be referred to as an X-direction parameter. Similarly, Ay, indicative of a distance from the center of the Y sensor to the focused position, will be referred to as a Y-direction parameter.

Figure 5:
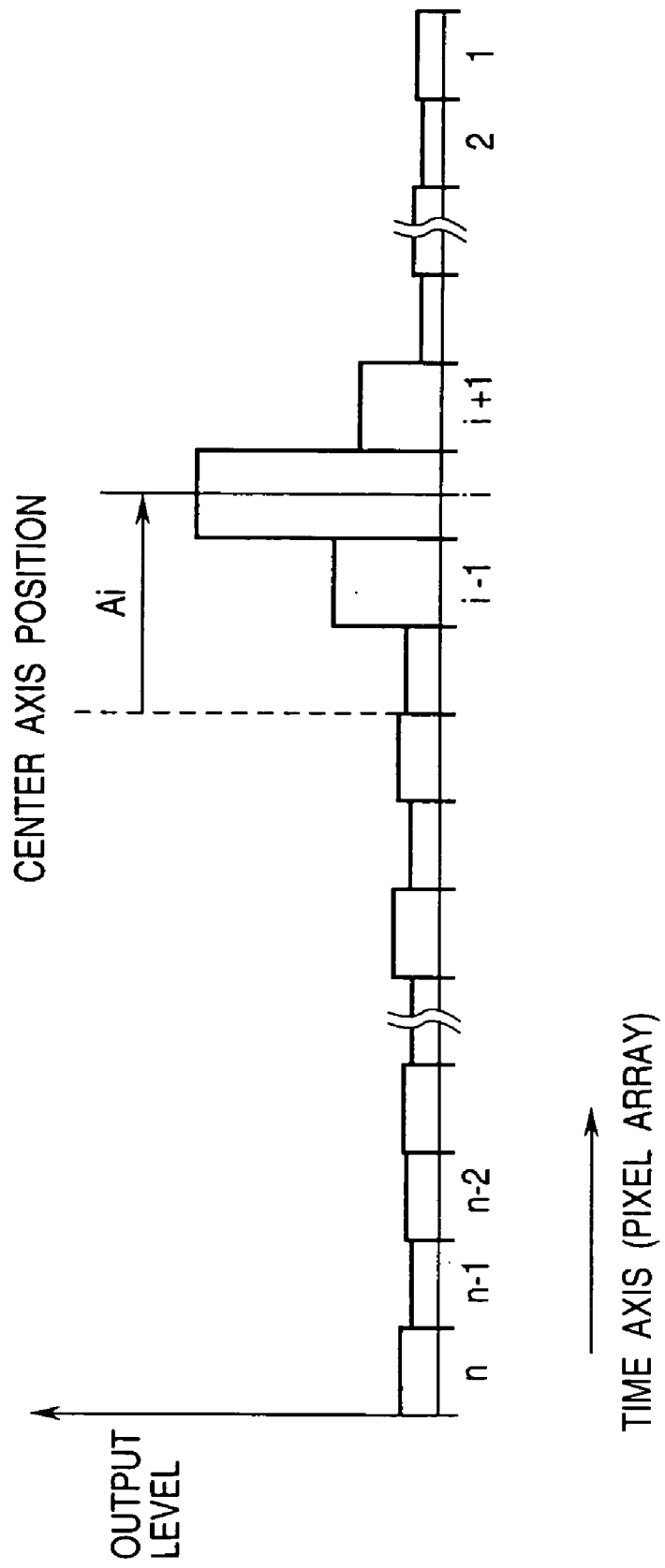
FIG. 5 is a graph showing a waveform of a signal read by X1 sensor according to the first embodiment of the present invention.

A waveform of a signal read by the X1 sensor in this state is shown in FIG. 5.

FIG. 5 is a graph showing a waveform of a signal read by the X1 sensor according to the first embodiment of the present invention.

As shown in FIG. 5, the read-out waveform of a signal, read from the X1 sensor, has a shape in which the time axis corresponds to the arrays of pixels of the X1 sensor. By reading the waveform and performing calculation, a coordinate of the position on which the light beam is focused, i.e., the coordinate value indicated by +Ai in FIG. 5, can be calculated. In addition, by changing the process contents of the calculation processing, a coordinate can be calculated with a resolution smaller than the size of each cell constructing the X1 sensor.

Next, the calculation principle of three-dimensional coordinates will be described with reference to FIG. 6.

Figure 6:
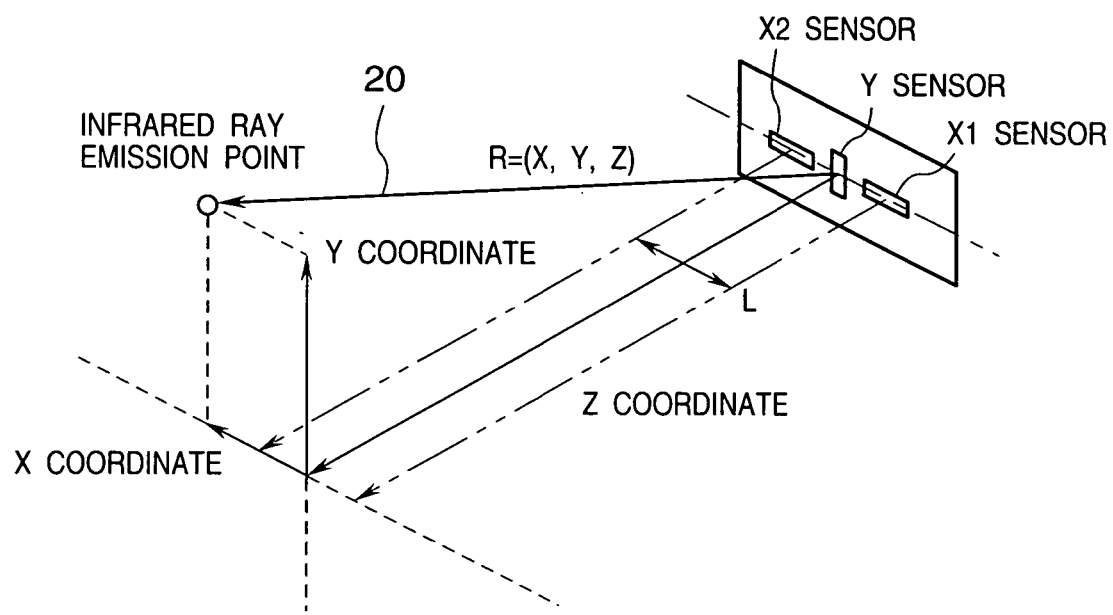
FIG. 6 is a view for explaining a calculation principle of three-dimensional coordinates according to the first embodiment of the present invention.

FIG. 6 is a view for explaining the calculation principle of three-dimensional coordinates according to the first embodiment of the present invention.

As shown in FIG. 6, according to the first embodiment, the relative three-dimensional position of the infrared ray emission device of the pointing device 1, with respect to the center of the sensor unit 2, is calculated. More specifically, a three-dimensional position vector R (X, Y, Z) 20 is calculated.

Hereinafter, calculation steps of the three-dimensional position vector R (X, Y, Z) 20 are described.

First of all, calculation steps of θx and Z are described with reference to FIG. 7.

Figure 7:
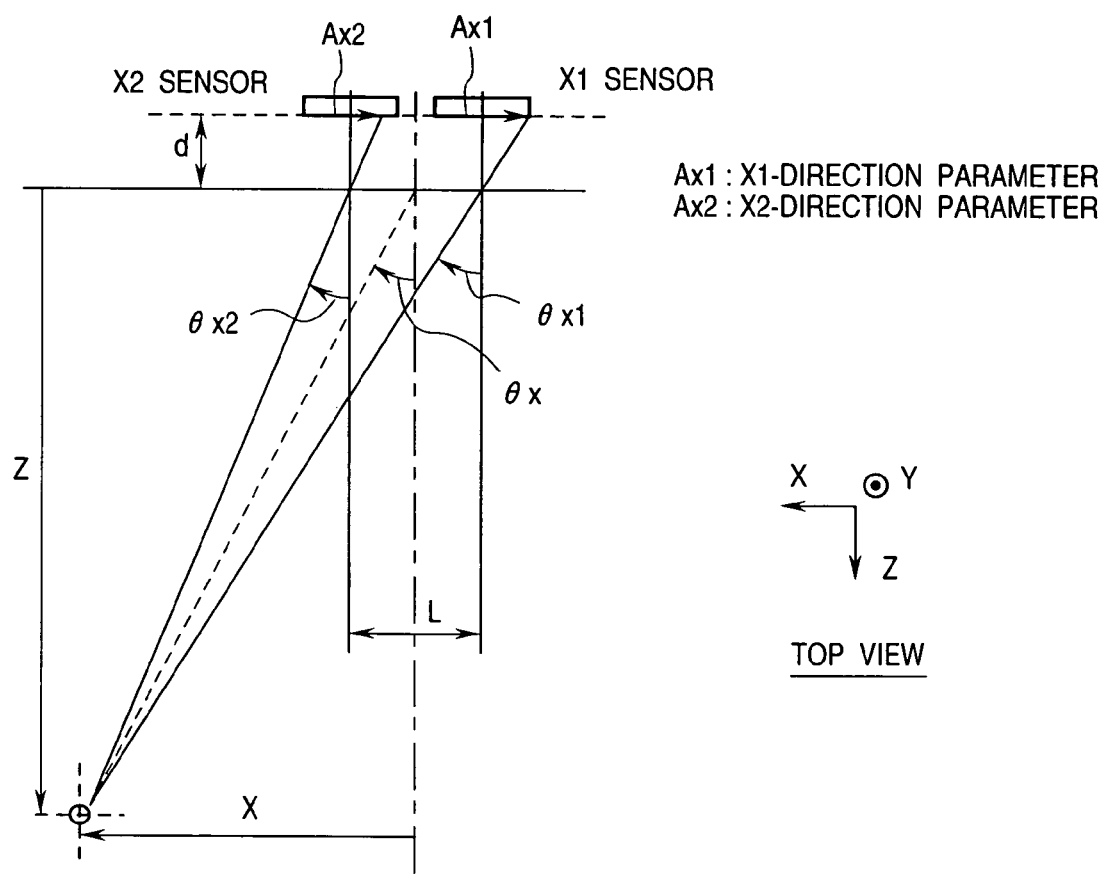
FIG. 7 is a view for explaining calculation steps of θx and Z according to the first embodiment of the present invention.

FIG. 7 is a view for explaining calculation steps of θx and Z according to the first embodiment of the present invention. According to the first embodiment, X1 and X2 sensors in the X-axis direction are placed on the same surface with a distance L, and each of them has the positional relation with the pointing device 1 as described above with reference to FIG. 3. Assuming that X-direction parameters of the X1 and X2 sensors are Ax1 and Ax2 respectively, the following equations (2) and (3) stand:

$$Ax1/d = \tan(\theta x1) \quad (2)$$

$$Ax2/d = \tan(\theta x2) \quad (3)$$

Moreover, equation (4) also stands:

$$\tan(\theta x) = \{\tan(\theta x1) + \tan(\theta x2)\}/2 \quad (4)$$

Accordingly, assuming that X-direction parameter Ax is defined by equation (5), equation (6) stands:

$$Ax \equiv \{Ax1 + Ax2\}/2 \quad (5)$$

$$\tan(\theta x) = Ax/d \quad (6)$$

In other words, if Ax1 and Ax2 are determined, θx can be calculated.

Next, Z is calculated. As shown in FIG. 7, since the X1 and X2 sensors are arranged with a distance L, the following relation is satisfied:

$$\{X+(L/2)\}/Z = \tan(\theta x1) = Ax1/d \quad (7)$$

$$\{X-(L/2)\}/Z = \tan(\theta x2) = Ax2/d \quad (8)$$

Thus, equation (9) stands:

$$Z = (d \times L)/\{Ax1 - Ax2\} \quad (9)$$

In other words, if Ax1 and Ax2 are determined, Z can be calculated.

Next, calculation steps of θy are described with reference to FIG. 8.

Figure 8:
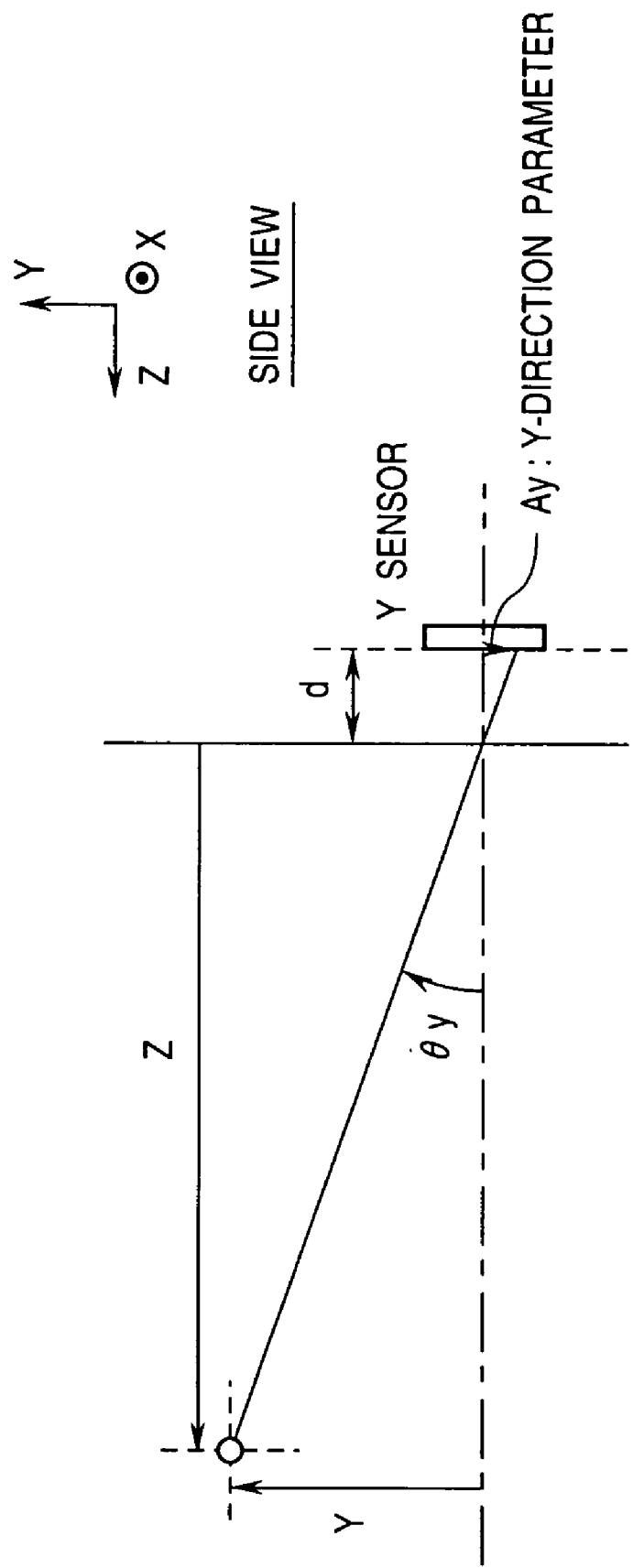
FIG. 8 is a view for explaining calculation steps of X and Y according to the first embodiment of the present invention.

FIG. 8 is a view for explaining calculation steps of θy according to the first embodiment of the present invention.

Similar to equations (2) and (3), the following equation (10) stands.

$$\tan(\theta y) = Ay/d \quad (10)$$

In other words, if Ay is determined, θy can be calculated.

As has been set forth above, (θx, Z, θy) can be calculated from the equations (6), (9) and (10).

X, Y and Z have the following relations according to FIGS. 7 and 8.

$$X = Z \times \tan(\theta x) \quad (11)$$

$$Y = Z \times \tan(\theta y) \quad (12)$$

In other words, (X, Y) can be calculated by equation (11) and (12).

According to the above-described calculation steps, three-dimensional position vector R(X, Y, Z) can be calculated.

Next, the functional configuration of the three-dimensional coordinate input apparatus according to the first embodiment is described with reference to FIG. 4.

Figure 4:
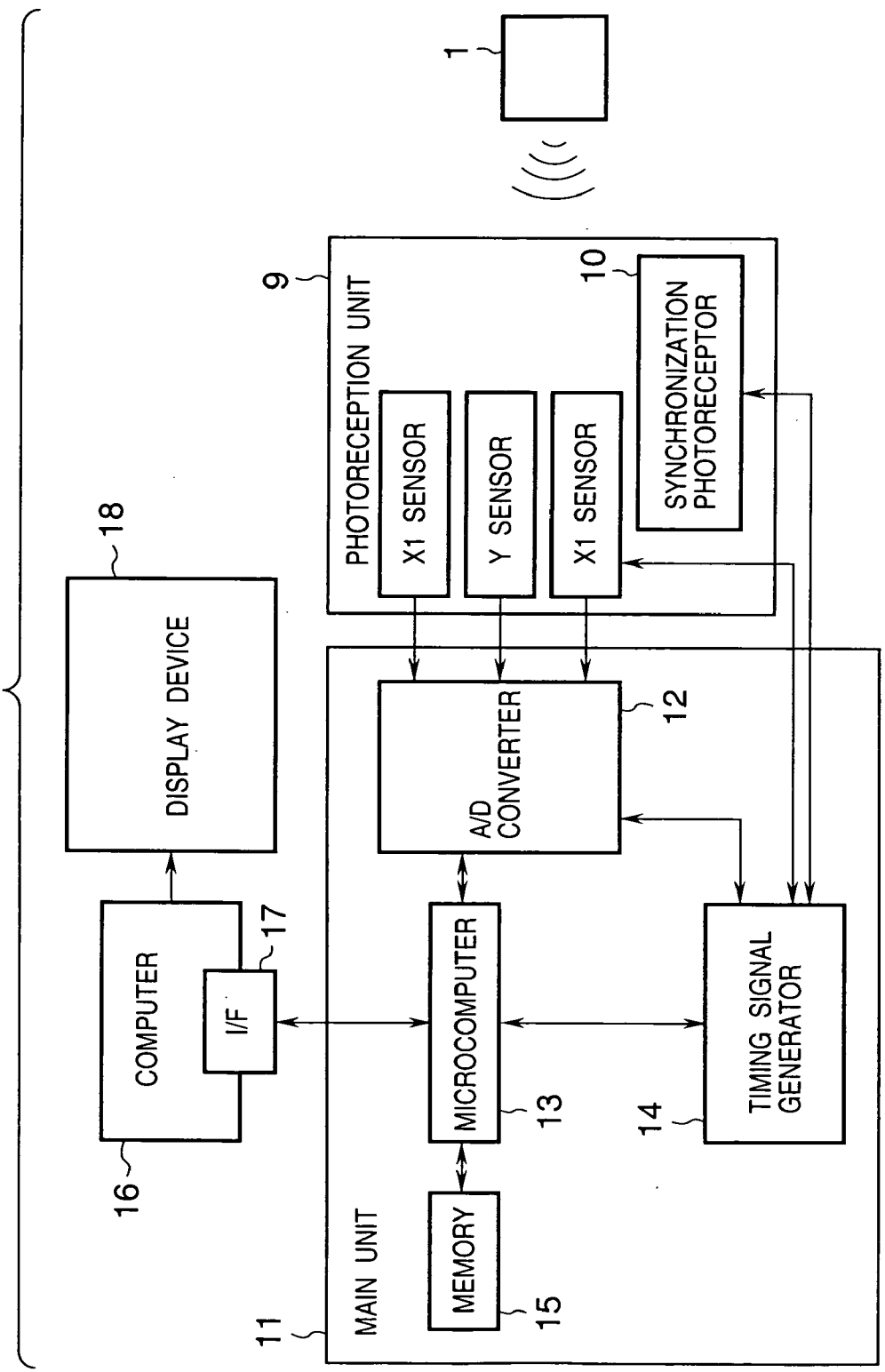
FIG. 4 is a block diagram showing a functional configuration of the three-dimensional coordinate input apparatus according to the first embodiment of the present invention.

FIG. 4 is a block diagram showing a functional configuration of the three-dimensional coordinate input apparatus according to the first embodiment of the present invention.

Infrared ray emitted by the infrared ray emission device of the pointing device 1 is received by the X1, X2, and Y sensors in the photoreception unit 9. The infrared ray is also received by a synchronization photoreceptor 10 provided for bringing synchronization with the emission timing of the infrared ray emission device. The infrared ray received by the X1, X2, and Y sensors are respectively converted to signals which correspond to the received photoreception amount. The signals are transmitted to an A/D converter 12, then converted to a data array having resolution of 8 to 12 bits. The data array is subjected to the above-described calculation steps described with reference to FIGS. 7 and 8 performed by a microcomputer 13. By this three-dimensional coordinates indicative of the three-dimensional position of the pointing device 1 are obtained. Then, the three-dimensional coordinate data is transmitted to a computer main body 16 (comprising a CPU, memory, hard disk, keyboard or the like which are standard components of a general computer) via an I/F 17, and display operation corresponding to the three-dimensional coordinates is executed on the display device 18.

Characteristics of the infrared ray emission device of the pointing device 1 and the photoreception unit 9 are in that, first of all, the light emitting side (pointing device 1) emits light in a predetermined cycle, and the photoreceptive side (photoreception unit 9) receives the light by turning on and off an electronic shutter function in synchronization with the light emission (the actual synchronization is performed by the synchronization photoreceptor 10 and timing signal generator 14). By this, disturbance noise can be suppressed. The second characteristic is in that a ring-type CCD is used for the sensor (X1, X2, Y sensors) constructing the photoreception unit 9. This achieves the effects of increasing a signal level and stabilizing the signal level.

Next, the ring-type CCD employed in the present invention will be described with reference to FIG. 9.

Figure 9:
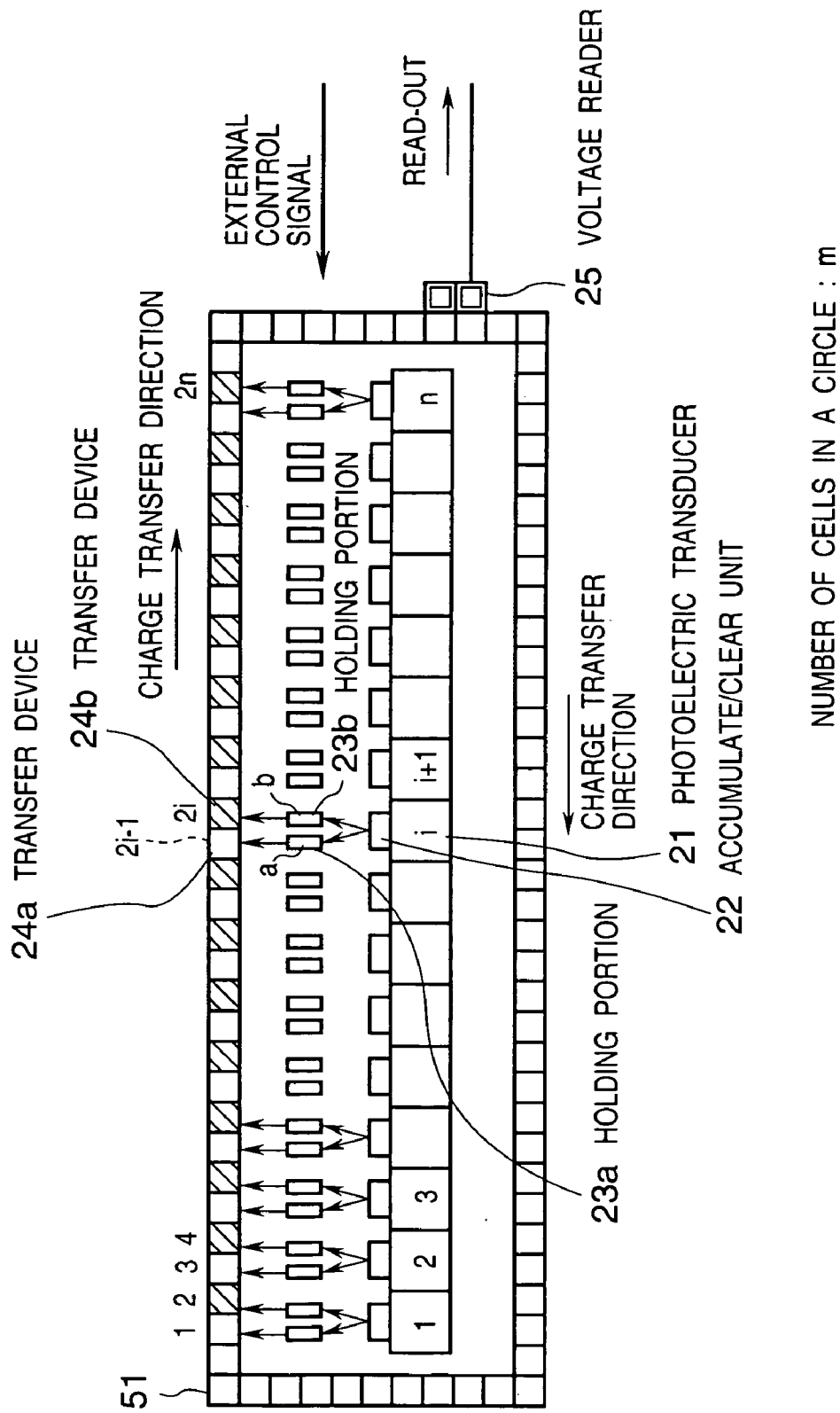
FIG. 9 is a view showing a construction of a ring-type CCD according to the first embodiment of the present invention.

FIG. 9 is a view showing a construction of the ring-type CCD according to the first embodiment of the present invention.

As shown in FIG. 9, the ring-type CCD comprises n number of photoelectric transducers 21 arrayed in a line, a cyclical charge transfer path 51 having m number of transfer devices (transfer cells) arranged in a ring, and a voltage reader 25 connected at a midpoint of the cyclical charge transfer path 51. The charge photoelectrically converted by the photoelectric transducer is accumulated or discharged by an accumulate/clear unit 22 according to an external control signal. The ring-type CCD controlled in the foregoing manner serves as the electronic shutter function. The external control signal enables the electronic shutter function to synchronize with the light emission (more specifically, the electronic shutter is turned on and off at each light-on and light-off of infrared-ray blinking). The accumulate/clear unit 22 discharges (to the ground) before accumulating the next charge.

During light emission of the light emission device, the electronic shutter function is turned on for a predetermined time period, and during light-off of the light emission device, the electronic shutter function is again turned on for a predetermined time period. The charges photoelectrically converted at both timing are independently stored in two holding portions which correspond to respective photoelectric transducers. Each holding portion corresponds to the transfer device which transfers a stored charge in one-on-one basis.

Description hereinafter is provided with an example of a charge photoelectrically converted by the i-th photoelectric transducer 21. A charge accumulated during light emission of the light emission device is transferred to the holding portion 23*a*. A charge accumulated during light-off of the light emission device is transferred to the holding portion 23*b*. Further, the charges stored in the holding portions 23*a* and 23*b* are simultaneously transferred to the ($2i$–1)th transfer device 24*a* and the $2i$-th transfer device 24*b* respectively. The transfer is performed not only for the i-th photoelectric transducer 21, but for all charges stored in respective holding portions corresponding to the photoelectric transducers 21 (1 to n-th). The transfer is performed once every blinking of an infrared ray (i.e., all the transfer is performed with the same cycle as the light emission cycle).

Meanwhile, the cyclical charge transfer path 51 having m number of transfer devices is controlled according to an external control signal so as to circulate in the same cycle as the light emission cycle. In other words, the cyclical charge transfer path 51 circulates once every blinking of the light emission device.

Accordingly, for instance, a charge in the $2i$-th transfer device 24*b* returns to the same position after one light emission cycle. Then, additional charge transfer is received again from the same holding portion which had previously transferred the charge. By performing plural number of times of circulation in the foregoing manner (in reality, several number of times to several tens of times), each transfer device is charged to a sufficient level.

Note that the electronic shutter function can be kept off by the external control signal. By this, the charge accumulation is terminated after the transfer device reaches a predetermined charge level, and mere circulation of the charges is performed.

The voltage reader 25 is connected to the cyclical charge transfer path 51. The charges accumulated in all transfer devices of the cyclical charge transfer path 51 are sequentially converted to a voltage and read out by the voltage reader 25. In this stage, the charges transferred and accumulated in order of the 1st to n-th photoelectric transducers 21 are observed on the time axis as shown in FIG. 5. Since this read-out function is non-destructive read-out, reading does not cause changes in the transfer charge amount.

The voltage reader 25 is connected to two transfer devices as shown in FIG. 9. Because of this configuration, the voltage reader 25 is able to read out the difference between a read-out voltage of an odd-numbered transfer device and a read-out voltage of an even-numbered transfer device. As has been described above, a charge accumulated during light-on of the blinking of the light emission device is transferred to an even-numbered transfer device (e.g., $2i$-th transfer device 24*b*), and a charge accumulated during light-off of the blinking of the light emission device is transferred to an odd-numbered transfer device (e.g., ($2i$–1) th transfer device 24*a*). By reading out the difference, disturbance noise can be cancelled and suppressed (in reality, selecting a several kHz for the light emission cycle can suppress many general disturbance noise).

As has been described above, according to the first embodiment, by pointing at an arbitrary position with the pointing device 1 having the infrared ray emission device, three-dimensional coordinates of the position can be calculated and inputted. Furthermore, by appropriately moving the pointing device 1, data indicative of such three-dimensional motion can be inputted in real time. This input means does not require a large mechanism, and input operation is intuitive. In addition, since the amount of calculation data is extremely small as compared to, e.g., image data, the load imposed on the CPU of the computer main body 16 is small.

By virtue of this, it is possible to realize a three-dimensional coordinate input apparatus having a high-speed response characteristic.

Second Embodiment

The first embodiment is constructed such that three-dimensional coordinates are inputted with the wireless pointing device 1. However, a system not requiring the pointing device to be wireless may have a construction shown in FIG. 10.

Figure 10:
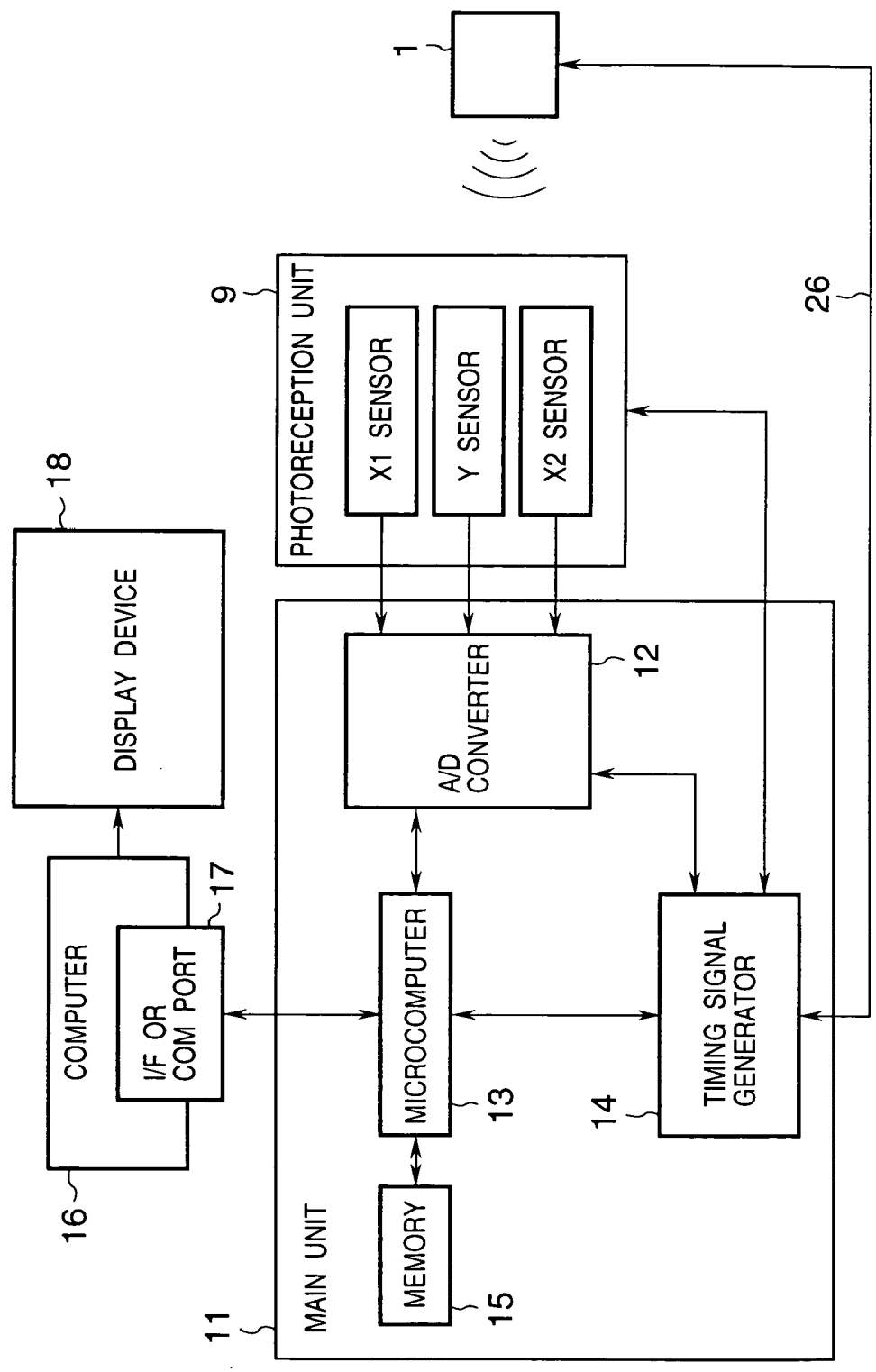
FIG. 10 is a block diagram showing a functional configuration of a three-dimensional coordinate input apparatus according to a second embodiment of the present invention.

FIG. 10 is a block diagram showing a functional configuration of a three-dimensional coordinate input apparatus according to the second embodiment of the present invention.

Note that with regard to the same components as that of the first embodiment in FIG. 4, the same reference numerals are assigned, and detailed description thereof will not be provided.

As shown in FIG. 10, a main unit 11 and the pointing device 1 are connected via a signal line 26. Therefore, the main unit 11 can obtain light emission timing for the infrared-ray emission device of the pointing device 1 through the signal line 26. Thus, the synchronization photoreceptor 10 provided inside the photoreception unit 9 in the first embodiment is not necessary in the second embodiment. In other words, the apparatus structure can be simplified.

Furthermore, because electric power is supplied to the pointing device 1 via the signal line 26, the pointing device 1 does not need to incorporate a power source such as a battery. Moreover, since electric power is supplied all the time, the pointing device 1 can include various switches. As described above, various advantages are attained.

As set forth above, according to the second embodiment, the system not requiring the pointing device 1 to be wireless can achieve the effects similar to the first embodiment with a simpler apparatus structure than that of the first embodiment.

Third Embodiment

The third embodiment is mainly constructed with the following components.

More specifically, the third embodiment comprises: a pointing device which emits an infrared ray; a photoreception unit which detects an incident angle of the infrared ray emitted by the pointing device and generates a plurality of data arrays; and a main unit having a controller which controls the function for calculating a three-dimensional position of the pointing device by computation based on the plurality of data arrays generated by the photoreception unit and transferring the calculated three-dimensional position data to a host computer, and which controls sensors of the photoreception unit.

When a user points at an appropriate direction with the pointing device, an infrared ray emitted by the pointing device is directed to a predetermined position of the photoreception unit having a photoreception sensor.

The pointing device comprises a light emission device which emits an infrared ray, and a plurality of switches which are switched back and forth or depressed by the user. The pointing device also comprises some type of modulation means for causing an infrared ray blink at a frequency of several kHz and transmitting the plurality of switch data carried by infrared ray during a light-on period of the blinking.

The photoreception portion of the photoreception unit is constructed with a plurality of sensors. The typical and simplest construction includes two line sensors in the X-axis direction (X1 and X2 line sensors), one line sensor in the Y-axis direction (Y line sensor), and one photoreception sensor (T sensor) detecting a single pixel.

The X1 and X2 line sensors respectively detect data arrays indicative of an X-axis component of an angle incident from the light emission point of the pointing device. The Y line sensor detects a data array indicative of an Y-axis component of an angle incident from the light emission point of the pointing device. The T sensor generates a signal waveform for detecting time axis data, for instance, receiving a modulation signal.

The X1 and X2 line sensors are arranged in the X-axis direction with a predetermined distance L, and are handled based on the concept of a so-called triangulation.

The main unit comprises a first signal processing function for calculating three-dimensional coordinates based on data arrays obtained from the X1 and X2 line sensors; a second signal processing function for detecting switch data of the pointing device based on the signal waveform obtained from the T sensor and detecting a timing of the infrared ray blinking; a control function for controlling the operation of the photoreception unit; and a communication function for transmitting, in real time, the data obtained by the first and second signal processing functions to the host computer.

The primary characteristic of the third embodiment is in that a ring-type CCD is used as the line sensor (details will be described later). The ring-type CCD comprises an electronic shutter function controlled externally. According to the third embodiment, an infrared ray blinking at a predetermined frequency is emitted from the light emission device of the pointing device, and this emission is synchronized with the electronic shutter function. By this, a disturbance light is suppressed (influence of the disturbance light is eliminated). Furthermore, the ring-type CCD has a cyclical charge transfer path, and has the function in which a charge generated in a photoelectric transducer (to be described later) is transferred to the cyclical charge transfer path, and as the charge circulates the path, a new charge is consecutively added and accumulated. Moreover, external control enables switching of the charging state between the state in which charges are consecutively added and accumulated and the state in which charges are not consecutively added and accumulated but only circulated. According to the present invention, this switching control is suitably performed in accordance with the amount of infrared ray emitted by the pointing device. For instance, in a case where a low level of infrared ray is received, charges are accumulated a large number of times, whereas in a case where a large level of infrared ray is received, charges are accumulated a small number of times. By virtue of this, a wide photoreceptive dynamic range can be attained.

Another characteristic of the third embodiment is to have the T sensor. As mentioned above, T sensor is a photoreception sensor detecting a single pixel. The ring-type CCD detects position data of an infrared ray emitted by the pointing device (to be exact, data indicative of an infrared ray incident direction). On the contrary, the T sensor detects time axis data of an infrared ray emitted by the pointing device. Herein, the time axis data is a signal indicative of blinking timing and a signal generated by modulating the blinking timing signal. The time axis data also serves as switch determination data of the pointing device.

Among the blinking timing signal, the signal ultimately captured by the T sensor is modulated by a frequency (in reality, several kHz) sufficiently higher than the blinking frequency. Furthermore, by changing the modulation method, the switch data is transmitted as an auxiliary signal. Since the T sensor is used for the above-described purpose, the T sensor must have a frequency characteristic in which a carrier frequency is detectable.

The signal generated by the T sensor is subjected to a band-pass filter, having the same frequency as the carrier frequency, then rectified, and as a result, extracted as a signal having less noise of disturbance light.

In the third embodiment, the ring-type CCD is controlled based on the blinking timing signal obtained from the T1 sensor for synchronizing the electronic shutter of the ring-type CCD with the blinking signal.

Figure 11:
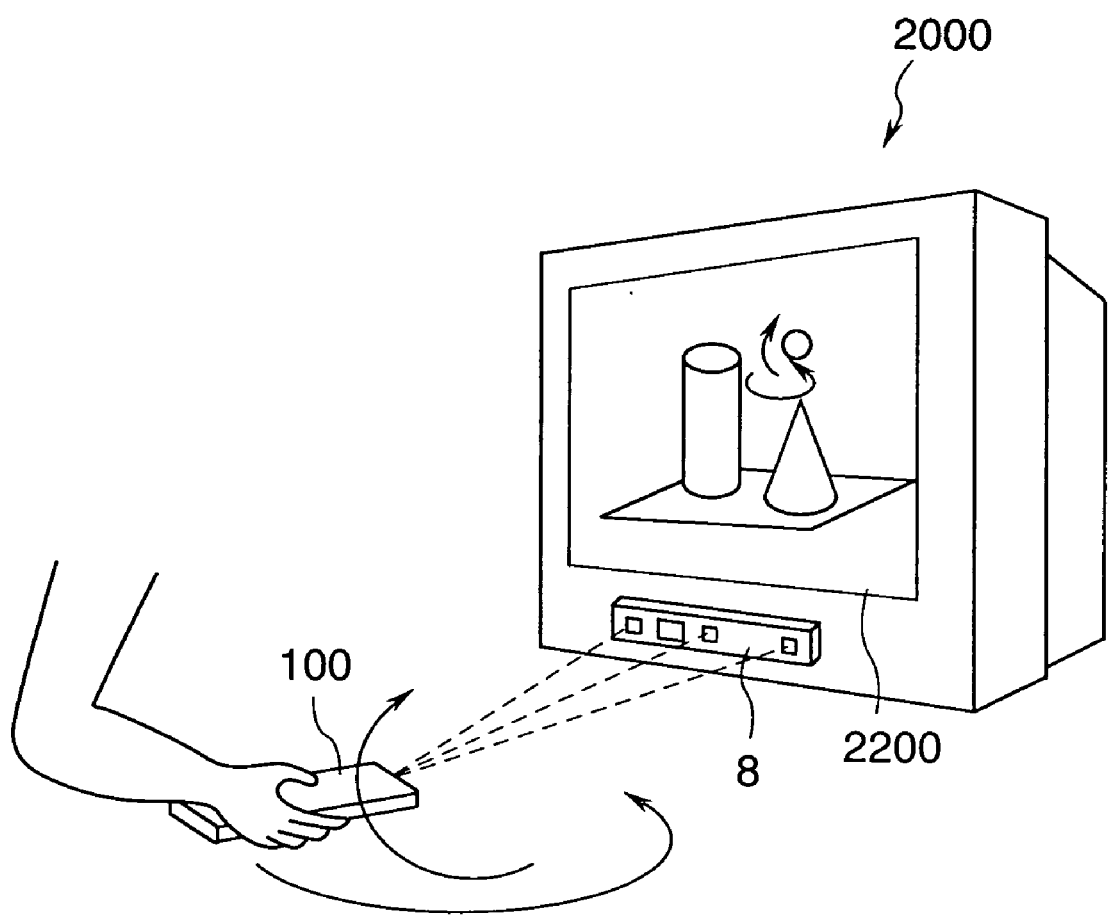
FIG. 11 is an external appearance of a three-dimensional coordinate input apparatus according to a third embodiment of the present invention.

FIG. 11 is an external appearance of a three-dimensional coordinate input apparatus according to the third embodiment.

According to the third embodiment, a photoreception unit 8 for three-dimensional input is provided below a display device 2200 of a host computer 2000. By pointing in the direction of the photoreception unit 8 with a pointing device 100 having a light emission device 60, an infrared ray is emitted to the photoreception unit 8. By this, the position (relative three-dimensional position with respect to the sensor's center) of the pointing device 100, e.g., wireless remote controller or the like, is inputted to the host computer 2000. Note that the above input operation can be performed in real time.

Next, the construction of the photoreception unit 8 is described with reference to FIG. 12.

Figure 12:
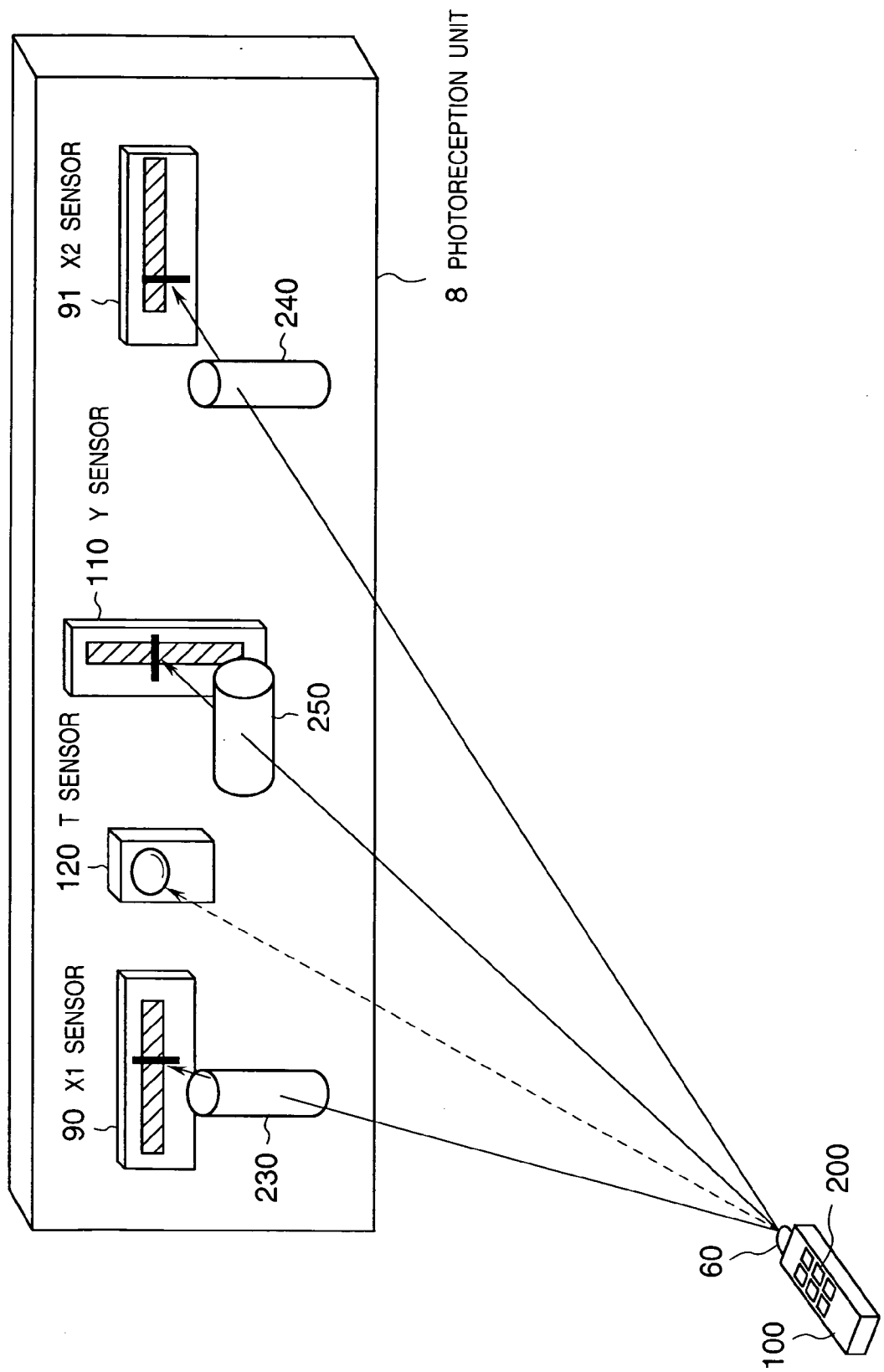
FIG. 12 is a view showing a construction of a photoreception unit according to the third embodiment.

FIG. 12 is a view showing a construction of the photoreception unit according to the third embodiment.

As shown in FIG. 12, the photoreception unit 8 comprises two line sensors (X1 line sensor 90 and X2 line sensor 91) in the X-axis direction. In front of the X1 line sensor 90 and X2 line sensor 91, cylindrical lenses 230 and 240 are arranged respectively. The photoreception unit 8 comprises one line sensor (Y line sensor 110) in the Y-axis direction, and in front of the Y line sensor 110, a cylindrical lens 250 is arranged. Furthermore, the photoreception unit 8 comprises a T sensor 120 detecting a single pixel.

The pointing device 100 comprises a light emission device (IRED) 60 emitting a light beam, and switches (SW) 200 for sending various commands. Details of these components will be described later.

Note that the positional relation between the pointing device 100 and photoreception unit 8 is the same as that of the pointing device 100 and sensor unit 2 of the first embodiment shown in FIG. 3. The calculation principle of three-dimensional coordinates can also be explained in the similar manner to the first embodiment. Therefore, the description is not provided herein.

Next, the functional configuration of the three-dimensional coordinate input apparatus according to the third embodiment is described with reference to FIG. 13.

Figure 13:
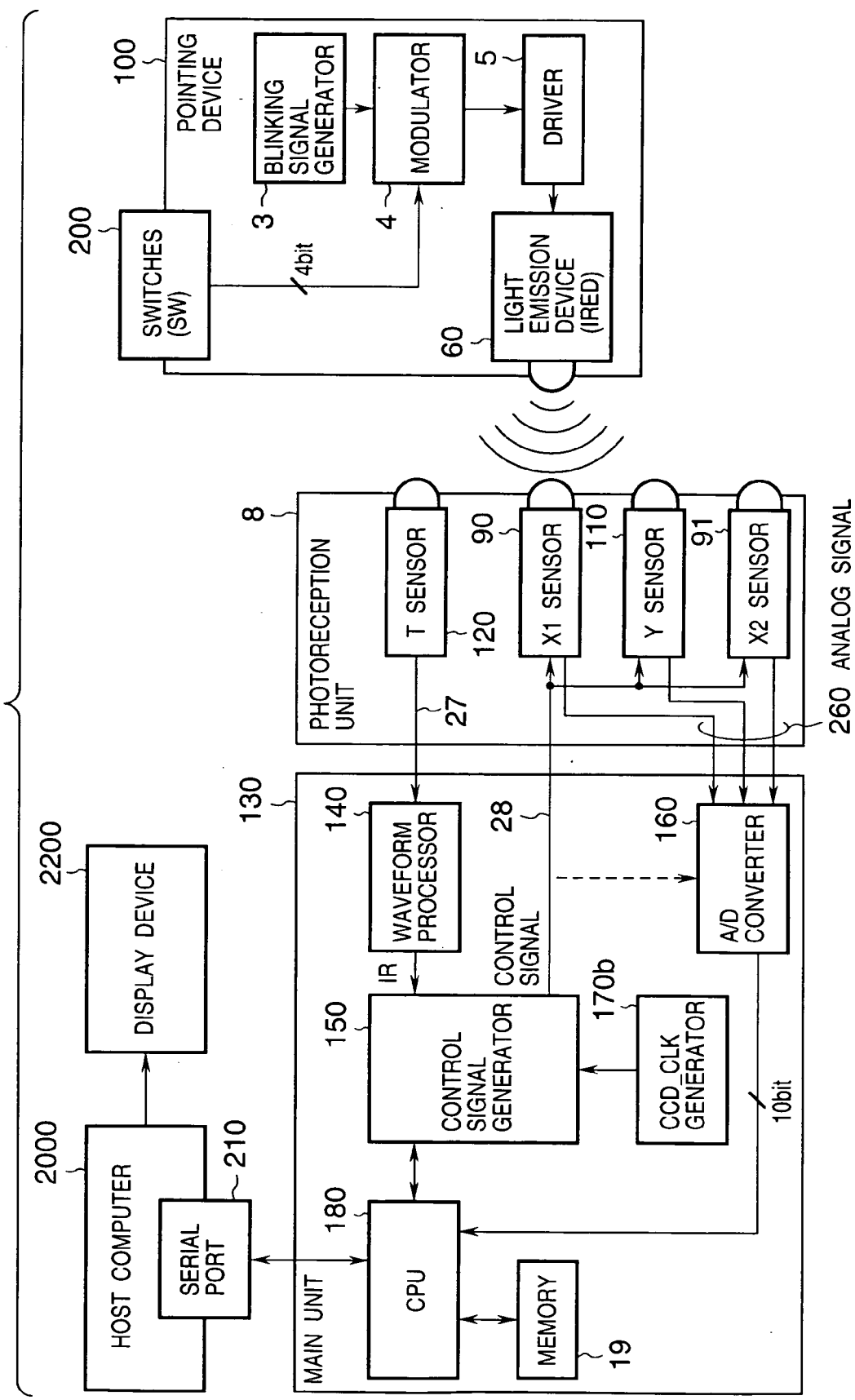
FIG. 13 is a block diagram showing a functional configuration of the three-dimensional coordinate input apparatus according to the third embodiment.

FIG. 13 is a block diagram showing a functional configuration of the three-dimensional coordinate input apparatus according to the third embodiment.

According to the third embodiment, the three-dimensional coordinate input apparatus mainly comprises: the pointing device 100 for emitting an infrared ray; photoreception unit 8 for receiving the emitted infrared ray and converting the infrared ray to an electric signal or a data array; and a main unit 130 for controlling the photoreception unit 8, calculating a three-dimensional position of the pointing device 100 based on the electric signal or data array generated by the photoreception unit 8, and transmitting the calculation result to the host computer 2000. The host computer 2000 and main unit 130 are connected via a serial port 210 which may employ an RS232C port or USB port.

The construction of the pointing device 100 is described with reference to FIGS. 13 and 14.

Figure 14:
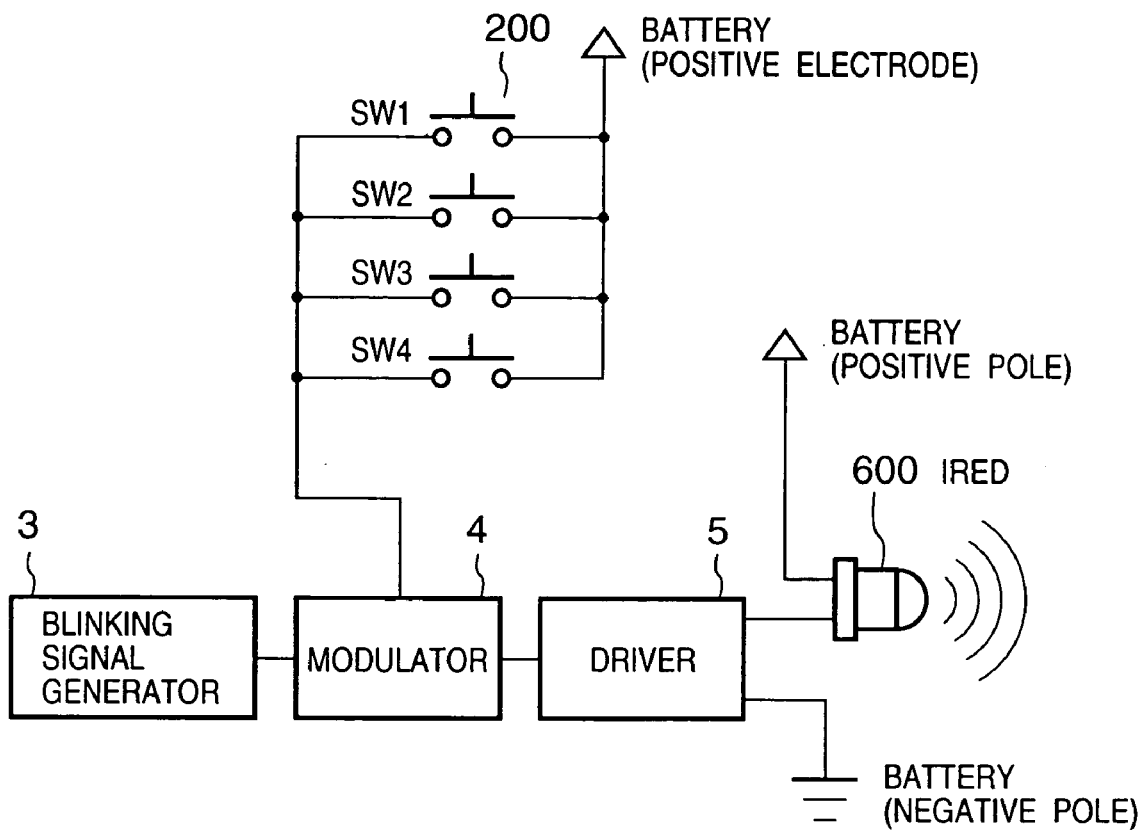
FIG. 14 is a block diagram showing a detailed construction of a pointing device according to the third embodiment.

FIG. 14 is a block diagram showing a detailed construction of the pointing device according to the third embodiment.

As shown in FIG. 14, the pointing device 100 comprises: the light emission device (IRED) 60 emitting a light beam; a blinking signal generator 3 for generating a light emission pattern; a modulator 4 for modulating signals in accordance with switch data; and a driver 5 which drives the light emission device. Herein, the switch data is inputted by switches (SW) 200. More specifically, in the third embodiment, the switches 200 consist of four switches SW1 to SW4 which will be described later in detail.

In FIG. 13, the photoreception unit 8 comprises the X1 line sensor 90, X2 line sensor 91 and Y line sensor 110, which are combined with the cylindrical lenses 230, 240 and 250 (FIG. 12) for focusing an infrared ray on the respective sensors, and T sensor 120 detecting a single pixel. The X1 line sensor 90 and X2 line sensor 91 respectively detect X-axis component of an infrared ray incident angle, and Y line sensor 110 detects Y-axis component of the infrared ray incident angle.

Figure 15:
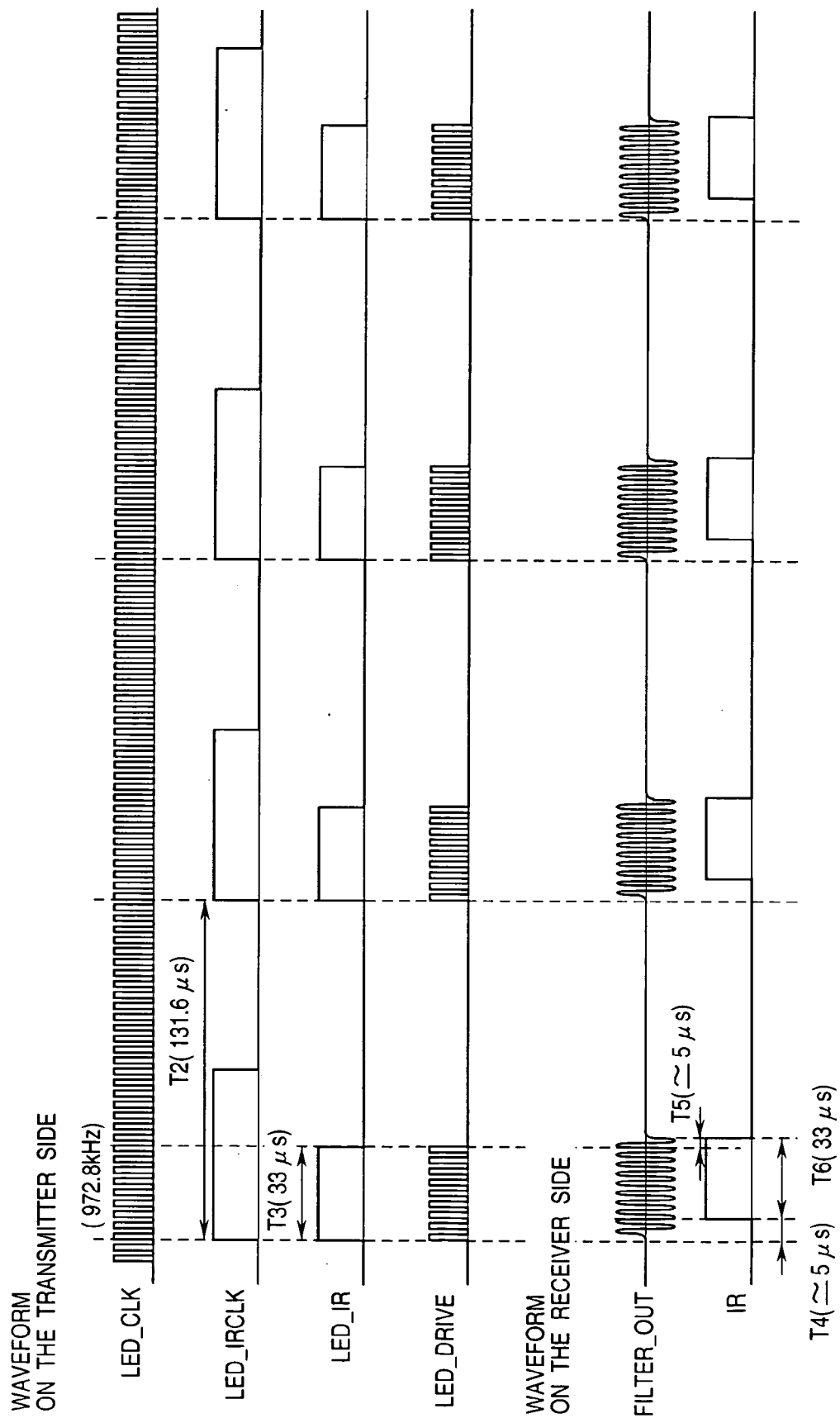
FIG. 15 is a timing chart of signals transmitted and received between the pointing device and main unit according to the third embodiment.

The X1 line sensor 90, X2 line sensor 91, and Y line sensor 110 are ring-type CCDS. Analog signals (data arrays) 260 obtained from these sensors are shown in FIG. 15. The position (indicated as Ai in FIG. 5) of the maximum amplitude value of the data array represents the focused position of each line sensor, i.e., incident angle. The analog signals (data arrays) 260 are converted to digital signals by an A/D converter 160, and based on the digital signals, three-dimensional coordinates of the pointing device 100 position are calculated by the CPU 180 and transferred to the host computer 2000. Herein, the X1 line sensor 90, X2 line sensor 91, and Y line sensor 110 are controlled by a timing sequence generated by a control signal generator 150.

Meanwhile, the T sensor 120 is a photoelectric transducer detecting a single pixel as mentioned above. The T sensor 120 detects time axis data of a light emitted by the pointing device 100. A signal 27 (modulation signal) obtained from the T sensor 120 is subjected to a band-pass filter in a waveform processor 140 for full-wave rectification, smoothing, and binarization. Then, the resultant signal IR is transmitted to the control signal generator 150.

In the control signal generator 150, auxiliary data (switch data of the pointing device 100) is detected by determining the signal IR according to a predetermined condition. Also, the falling timing of the signal IR is detected, and based on the detected timing, a reset signal RESET is generated. Furthermore, the reset signal RESET triggers a sequence of timing pulses (hereinafter referred to as timing sequence) which is then transmitted as a control signal 28 to the X1 line sensor 90, X2 line sensor 91 and Y line sensor 110.

The timing sequence is repeated each time three-dimensional coordinates of a point is inputted, and the X1 line sensor 90, X2 line sensor 91, and Y line sensor 110 are controlled accordingly.

In order to execute the timing sequence, a CCD_CLK generator 170b which supplies the CPU 15 with a CCD_CLK signal is connected to the control signal generator 150.

A memory 19 serves as a work area for the CPU 180 to execute various processing and as a temporary saving area of various data.

Next, a waveform LED_DRIVE for driving the light emission device 60 of the pointing device 100 is shown in FIG. 15. In the modulator 4 of the pointing device 100, a signal LED_IRCLK is generated by dividing the frequency of a signal LED_CLK (e.g., 972.8 kHz) by, for instance, 128. A signal LED_IR has the same cycle as the signal LED_IRCLK and has a predetermined duty (e.g., 33 $\mu$s of Hi period). The signal LED_DRIVE is a signal which actually drives the light emission device 60, and is obtained by outputting the signal LED_CLK while the signal LED_IR is high.

Next, a detailed construction of the waveform processor 140 is described with reference to FIG. 16.

Figure 16:
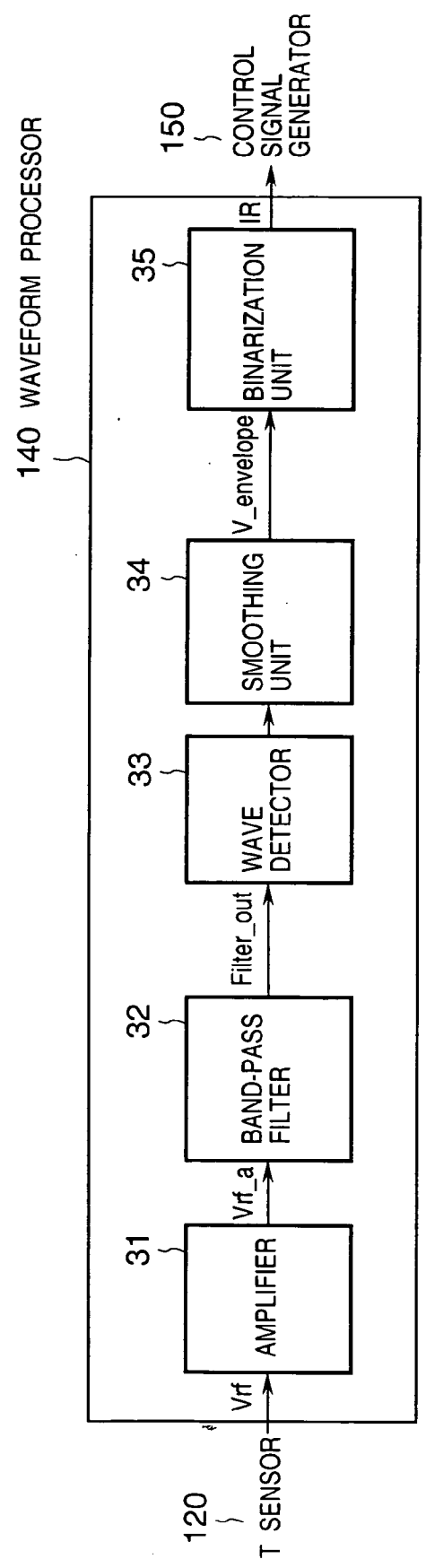
FIG. 16 is a block diagram showing a detailed construction of a waveform processor according to the third embodiment.

FIG. 16 is a block diagram showing a detailed construction of the waveform processor according to the third embodiment. A signal photoelectrically converted by the T sensor 120 is amplified by an amplifier 31 to a predetermined level, and is subjected to a band-pass filter 32 having a resonance frequency substantially the same as the frequency of the signal LED_CLK. Next, the signal is inputted to a wave detector 33, smoothing unit 34, and binarization unit 35, then outputted as a signal IR and transmitted to the control signal generator 150. The output signal FILTER_OUT of the band-pass filter 32 is shown in FIG. 15.

The signal LED_IR transmitted by the pointing device 100 is reproduced as a signal IR in the foregoing manner. Note that in the signal IR, a slight delay (in the third embodiment, about 5 $\mu$ seconds) occurs at the rising point T4 and falling point T5 due to an influence of phase characteristics of the band-pass filter 32 and smoothing unit 34. Therefore, the signal IR is delayed from the signal LED_IR by the foregoing time period.

According to the third embodiment, the pointing device 100 has switches 200. The switches 200 are used for switch input operation represented by, for instance, depressing the right or left buttons of a mouse, or up or down switches of a pen (digitizer). The switches may be used in other usage.

The light-on period of the blinking signal of the pointing device 100 is entirely or partially changed based on a carrier frequency which is sufficiently higher than the blinking frequency. By this, all the infrared ray emitted is effectively detected by the X1 line sensor 90, X2 line sensor 91 and Y line sensor 110, whereas only the modulated signal is effectively detected by the T sensor 120.

Figure 17:
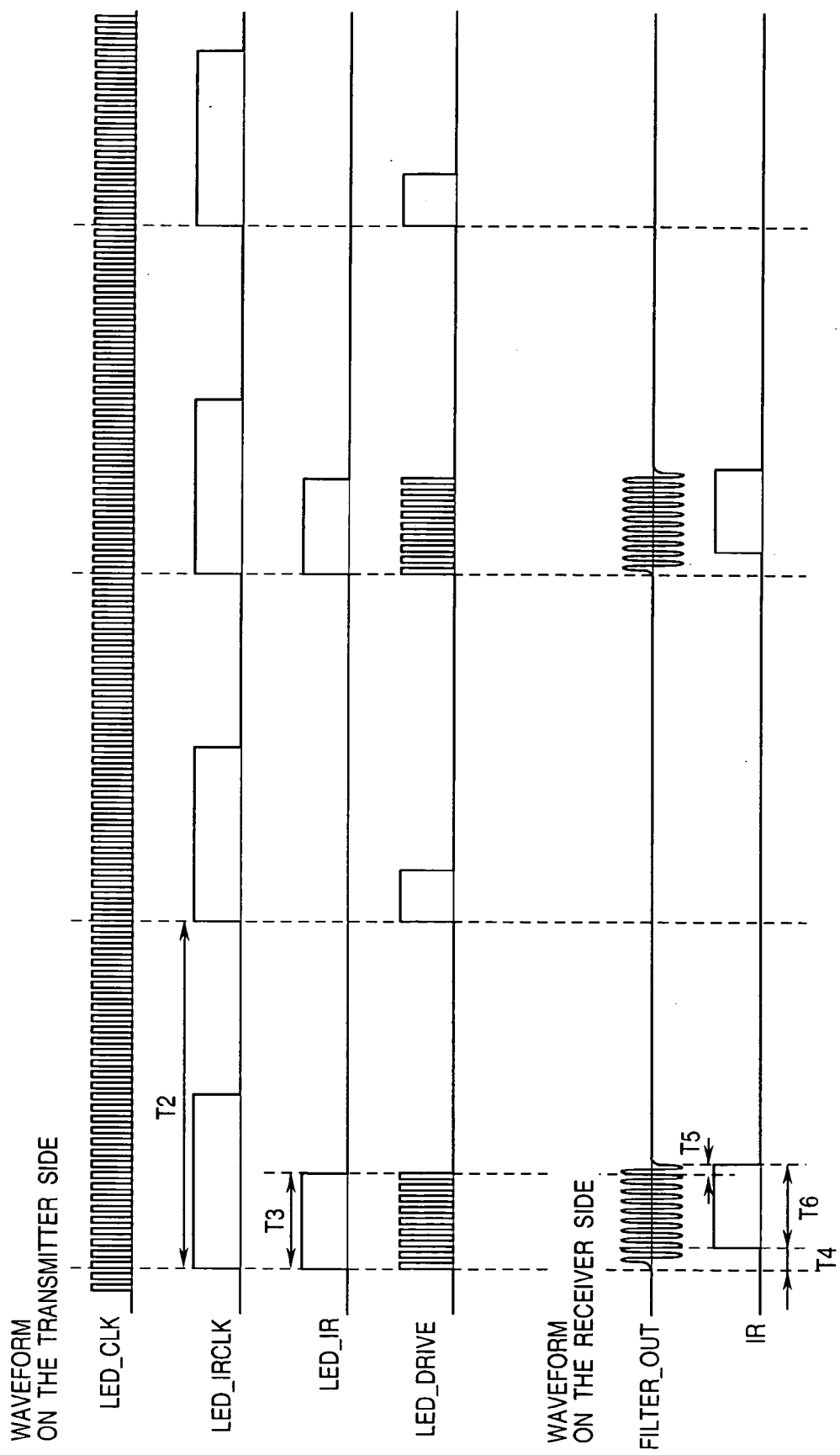
FIG. 17 is a timing chart of signals transmitted and received between the pointing device and main unit according to the third embodiment.
Figure 23:
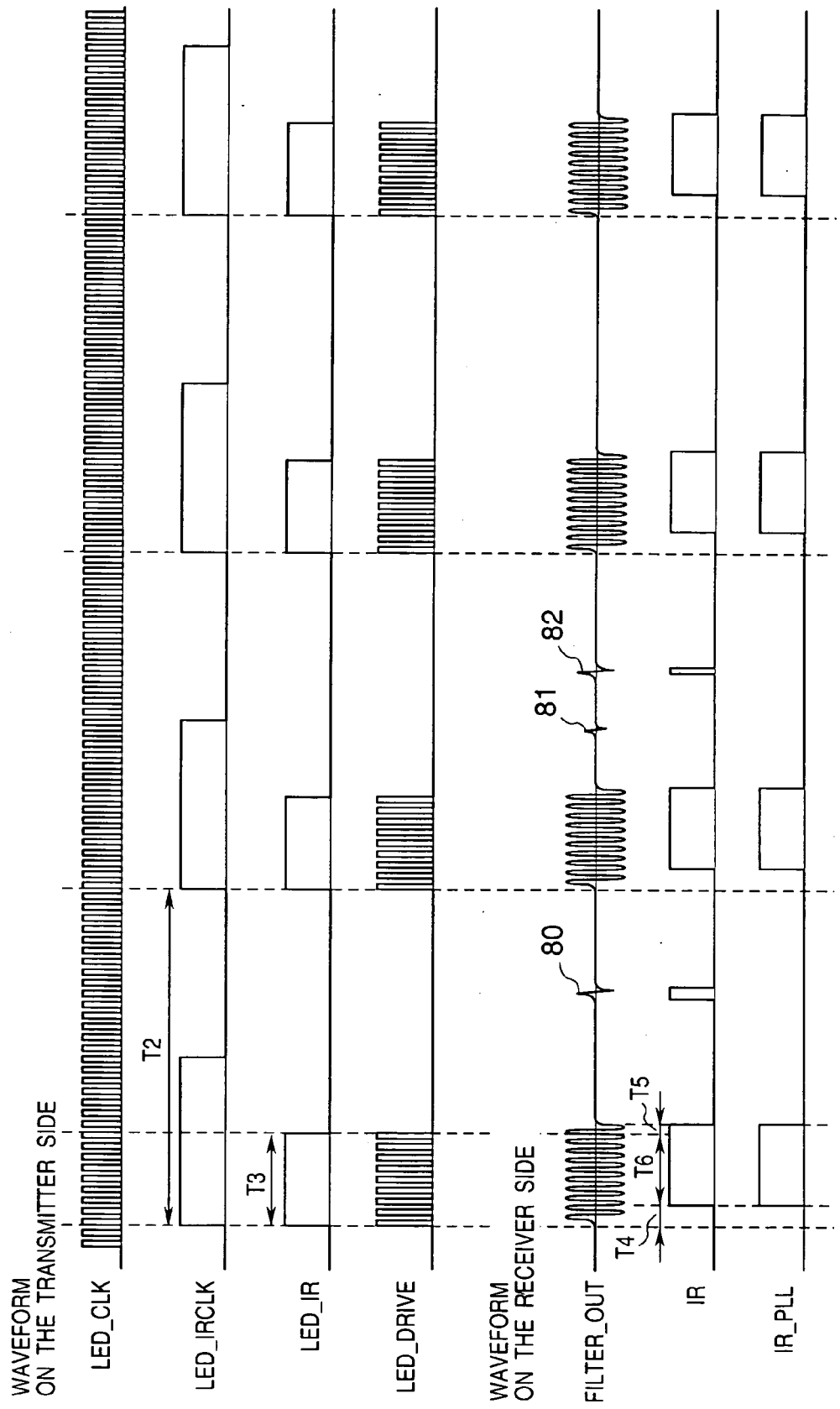
FIG. 23 is a timing chart of signals transmitted and received between the pointing device and main unit according to the fourth embodiment.

Therefore, only the modulated signal serves as the time axis data. In the third embodiment, when the switches 200 are not depressed, the signal LED_DRIVE is constantly modulated as shown in FIG. 23. When a particular switch of the switches 200 is depressed, the signal LED_DRIVE is modulated alternately as shown in FIG. 17.

Accordingly, from the ring-type CCD side, both of the above-described light emission patterns seem as if signals are blinking in the same cycle (T2), while from the T sensor 120 side, the emission patterns seem as if the signals are blinking in the same cycle T2 when switches are not depressed, but blinking alternately (or in the cycle of T2×2) when a switch is depressed. Therefore, in the coordinate detection using the ring-type CCD, the detection is equally performed in either case of switch being turned on or off, and one-bit data can be communicated with the photoreception unit 8 as switch data.

The ring-type CCD which constitutes the X1 line sensor 90, X2 line sensor 91, and Y line sensor 110 is a type of line sensor. The ring-type CCD largely differs from the general line sensor by having a cyclical (ring shape) portion for transferring a charge obtained by photoelectric conversion.

The construction of the ring-type CCD has already been described in the first embodiment with reference to FIG. 9. However in the following example, assume that the number of pixels (n) constructing the photoelectric transducer 21 is 64, and the number of transfer devices (m) constructing the cyclical charge transfer path 51 is 150.

Figure 18:
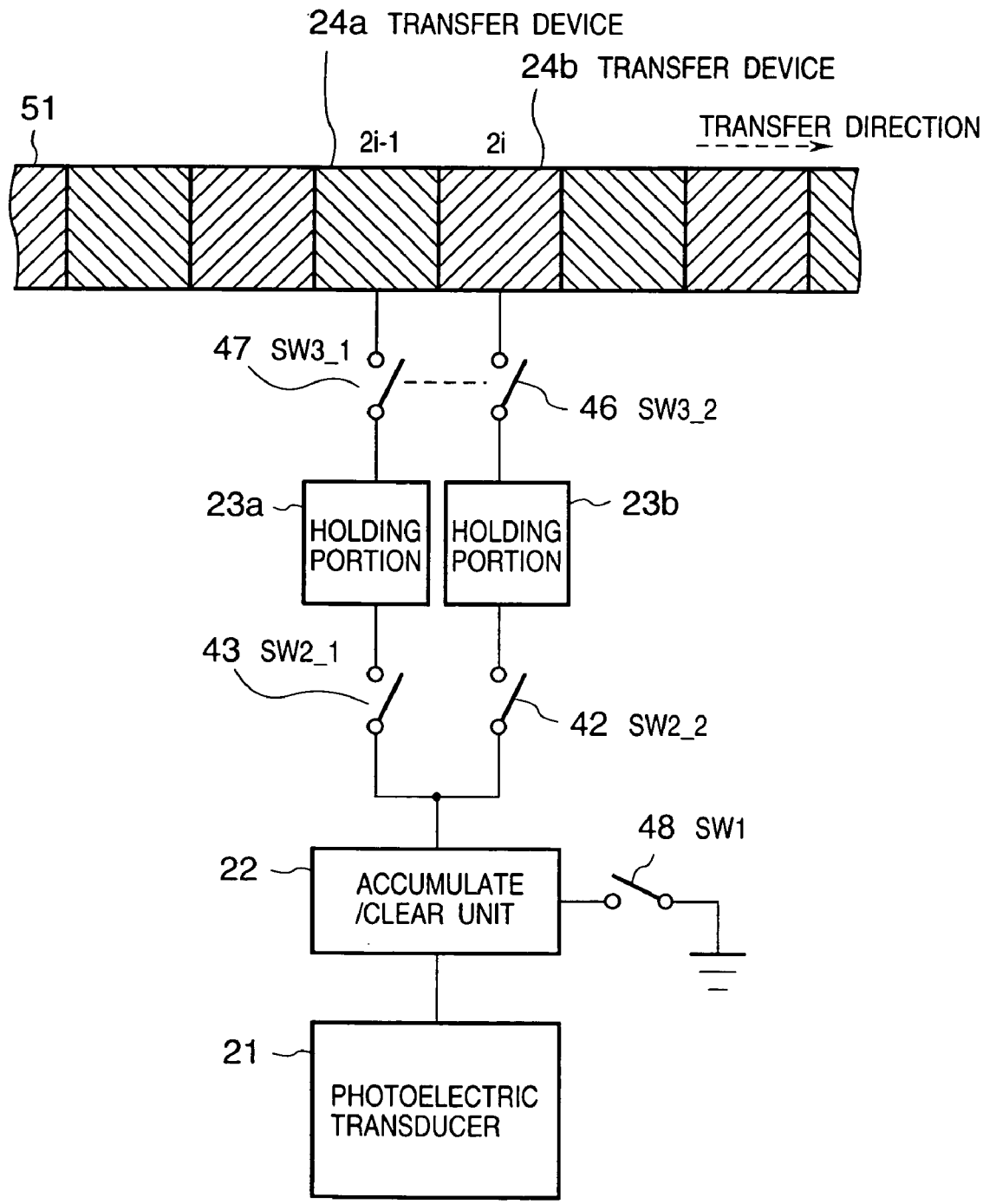
FIG. 18 is a view showing in detail a partial structure of a ring-type CCD according to the third embodiment.

First, description will be provided with reference to FIG. 18 for a detailed configuration of the portion including the i-th photoelectric transducer, (2i−1)th transfer device 24a and 2i-th transfer device 24b of the cyclical charge transfer path 51 shown in FIG. 9.

Figure 19:
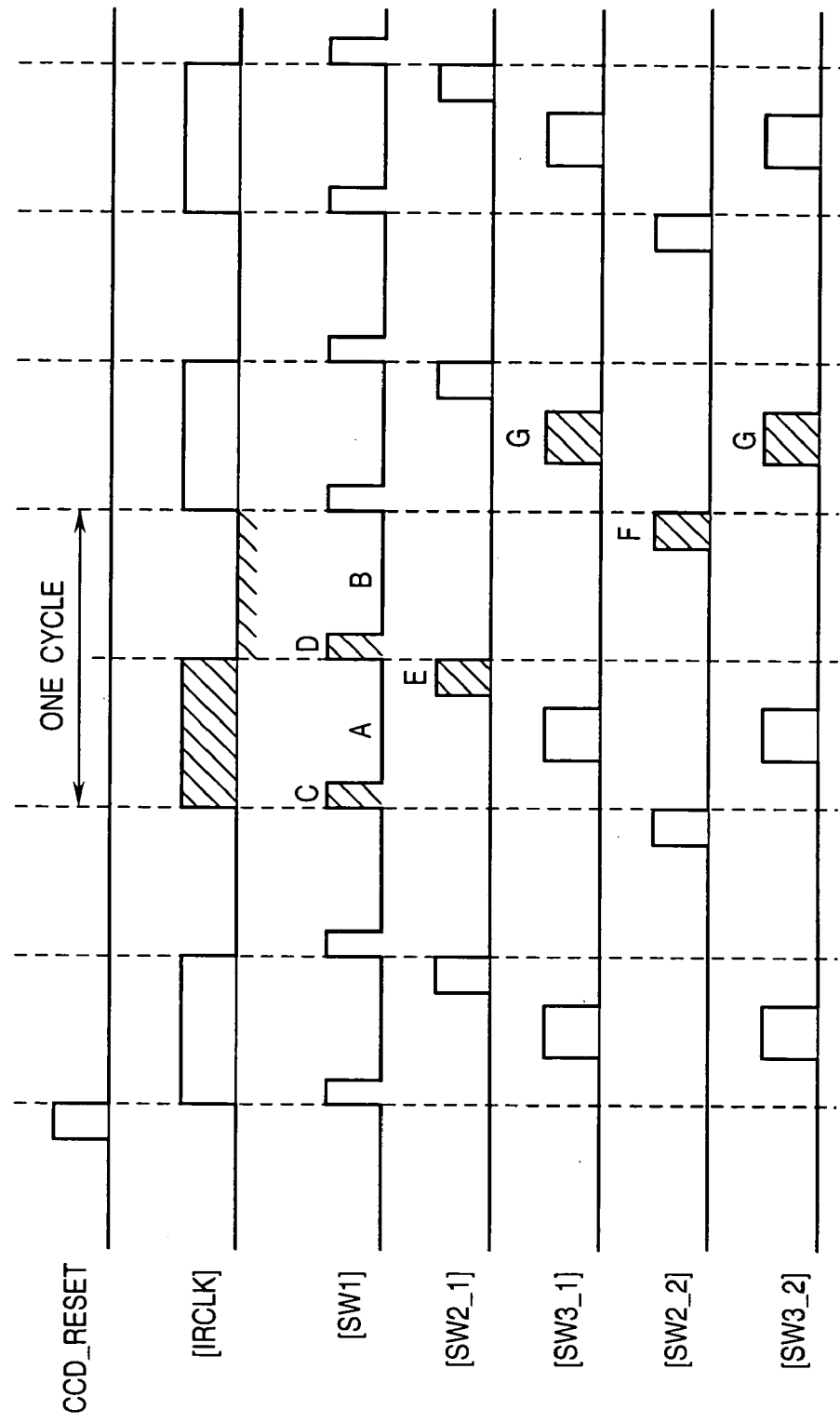
FIG. 19 is a timing chart of each switch according to the third embodiment shown in FIG. 18.

FIG. 18 is a view showing in detail a partial structure of the ring-type CCD according to the third embodiment. FIG. 19 is a timing chart of each switch according to the third embodiment shown in FIG. 18.

In the timing chart of each switch in FIG. 19, the signal IRCLK is the basic cycle. The cycle of the signal IRCLK is, for instance, 7.6 kHz, which is substantially equal to the signal LED_IRCLK in FIG. 19. The signal IRCLK is obtained by dividing the frequency of the signal CCD_CLK (e.g., 9.12 kHz) by 8, then by further dividing the frequency by 150 (=m). According to the present invention, the ring-type CCD controlled in the aforementioned cycles serves as the electronic shutter function. In one cycle of the signal IRCLK, the electronic shutter function is turned on twice.

The hatched portion in FIG. 19 corresponds to a pair of electronic shutter operation (turning on the electronic shutter twice). The electronic shutter operation is executed as follows. First, a charge in the accumulate/clear unit 22 is cleared by the SW1 (48 in FIG. 18) at timing C. Next, at timing A, the current generated in the photoelectric transducer 21 is accumulated in the accumulate/clear unit 22. At timing E, SW2_1 (43 in FIG. 18) is turned on and the charge is transferred to the holding portion 23a. Similarly, at timing D, a charge in the accumulate/clear unit 22 is cleared by the SW1 (48 in FIG. 18). Then, at timing B, the current generated in the photoelectric transducer 21 is accumulated in the accumulate/clear unit 22. At timing F, SW2_2 (42 in FIG. 18) is turned on and the charge is transferred to the holding portion 23b.

Charges held in the holding portions 23a and 23b are simultaneously transferred to the (2i−1)th and 2i-th transfer cells respectively at timing G.

In the third embodiment, the signal IRCLK is synchronized with the signal LED_IRCLK. By this, the pointing device 100 emits light during the timing A, but does not emit light during the timing B in FIG. 19. By virtue of this timing, a charge generated during light emission is held in the holding portion 23a and a charge generated during light-off is held in the holding portion 23b. By this process, the charge generated during light emission is transferred to the (2i−1)th cell of the transfer device, and the charge generated during light-off is transferred to the 2i-th cell. The operation executed at each of the timings A, B, C, D, E is performed simultaneously for all the pixels.

Next, operation of the cyclical charge transfer path 51 is described.

The cyclical charge transfer path 51 circulates once in one cycle of the signal IRCLK shown in FIG. 19. Therefore, for instance, charges held in the (2i−1)th and 2i-th transfer cells return to the same cells in one cycle of the signal IRCLK. In each cycle, the newly held charges in the cells are added to the holding portions 23a and 23b respectively.

In the third embodiment, the cyclical charge transfer path 51 is constructed by 150 cells (m=150). Therefore, a transfer clock CCD_SP of the cyclical charge transfer path 51 has a cycle (1.14 MHz) that is one 150th of the signal IRCLK.

Moreover, the voltage reader 25 provided partway of the cyclical charge transfer path 51 is able to non-destructively read a voltage value of a charge by converting the charge which is transferred in the cyclical charge transfer path 51. Moreover, a difference in the voltage values of adjacent two transfer cells can be read. Therefore, for instance, a difference in the values of the charges, transferred from the holding portions 23a and 23b to the (2i−1)th and 2i-th transfer cells respectively, can be read.

By virtue of this function of the third embodiment, it is possible to read out a voltage signal which corresponds to a charge difference between a charge accumulated during light emission of the pointing device 100 and a charge accumulated during light-off of the pointing device 100. By this, it is possible to eliminate at least the disturbance light having a frequency component considerably lower than blinking frequency.

The voltage reader 25 reads out a signal in the chronological order in the sequence of actual arrangement of the transfer devices. FIG. 5 exemplifies this by showing voltage values read in order of the n-th pixel to the first pixel. The voltage level near the i-th pixel is high because light emitted by the pointing device 100 is focused in the neighborhood of the i-th transfer device of the transfer devices constructing the ring-type CCD. In other words, by calculating the value Ai in FIG. 5 with respect to the X1 line sensor 90, X2 line sensor 91 and Y line sensor 110, the parameters which are used for detecting an incident angle of the infrared ray can be obtained.

Next, the controlling of the ring-type CCD is described.

In the third embodiment, each time coordinate data for a point is inputted, the ring-type CCD is repeatedly controlled by the timing sequence generated by the control signal generator 150.

Figure 20:
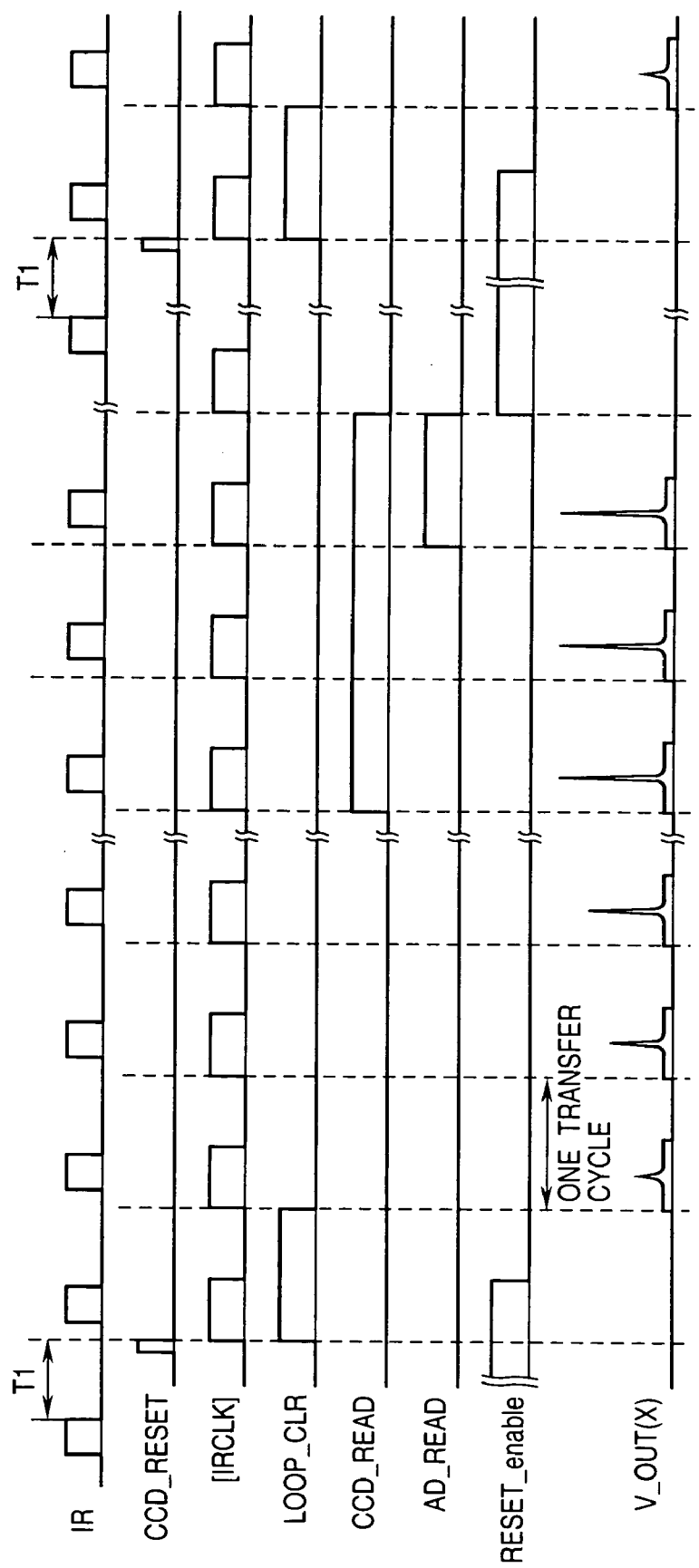
FIG. 20 is a timing chart of signals generated by a control signal generator according to the third embodiment.

In FIGS. 19 and 20, signals in brackets [ ] are generated inside the ring-type CCD. Other signals are supplied by an external unit of the ring-type CCD.

When a signal CCD_RESET is supplied, this triggers the ring-type CCD to divide the frequency of the signal CCD_CLK by 8, thereby generating a signal CCD_SP, then further divide the frequency of the signal CCD_SP by 150 (thus, divided by 1200 in total), thereby generating a signal IRCLK. Note, as mentioned above, the signal CCD_SP is a transfer clock of the cyclical charge transfer path 51.

As mentioned above, the signal IRCLK is a basic cycle for the operation of twice turning on the electronic shutter and transferring a charge from the photoelectric transducer 21 to the cyclic charge transfer path 51.

Next, the timing chart in FIG. 20 is described.

First, a signal LOOP_CLR is supplied from an external unit in synchronization with the signal IRCLK. By the signal LOOP_CLR, a charge remaining in the cyclical charge transfer path 51 is cleared. Then, according to the signal IRCLK, charges are sequentially added and accumulated, and a read-out waveform V_OUT(X) read by the voltage reader 25 gradually increases. The read-out waveform level is monitored by the control signal generator 150. When the level reaches a predetermined level, the signal CCD_READ becomes High. The ring-type CCD continues charge accumulation while the signal CCD_READ is Low, but when the signal CCD_READ becomes High, stops the charge accumulation and performs only charge circulation. Therefore, the read-out waveform V_OUT(X) is invariable. After that, as the signal AD_READ becomes High, the read-out waveform V_OUT(X) is read by the A/D converter 160 to be converted to a digital signal, and then transmitted to the CPU 180.

Herein, as described above, the signal CCD_READ is Low until the read-out waveform V_OUT(X) reaches a predetermined value. Thus, when a signal level is high (when the level of the emitted light is high), the time period during which the signal CCD_READ is Low is short. On the other hand, when a signal level is low (when the level of the emitted light is low), the time period during which the signal CCD_READ is Low is long. In this manner, the actually inputted read-out waveform is constant regardless of the signal levels.

Next, description is provided on synchronization processing between blinking of the light-emission device 60 of the pointing device 100 and the electronic shutter operation of the ring-type CCD.

In the third embodiment, the cycle of the light emission (signal LED_DRIVE) of the pointing device 100 is 7.6 kHz, which is one 128th of the frequency of the signal LED_CLK. A frequency of the signal IRCLK is a repetition frequency (one cycle corresponds to twice turning on the shutter) of the electronic shutter operation of the ring-type CCD on the photoreception side, and is 7.6 kHz. This frequency is obtained by dividing the frequency of the signal CCD_CLK by the total of 1200. In other words, the blinking frequency of the light emission side and the repetition cycle of the electronic shutter operation on the photoreception side are set substantially the same in advance.

Herein, as shown in FIG. 19, the timing sequence of the ring-type CCD is generated so as to start by the signal CCD_RESET. Particularly, it is so designed that the rising of the signal IRCLK generated by the ring-type CCD follows immediately after the falling of the signal CCD_RESET. Therefore, by controlling the timing of the signal CCD_RESET, the timing (phase) of the signal IRCLK can be controlled. More specifically, the timing is set so that the signal CCD_RESET falls after a predetermined delay period T1 (e.g., 77.2 $\mu$s) from the signal IR, obtained by detecting a light beam emitted by the pointing device 100 with the T sensor 120 and subjecting the detected signal to the waveform processor 140. By this, at least immediately after the falling of the signal CCD_RESET, phases of the signal IRCLK and LED_IR can be matched. This is equivalent to matching the phases of the blinking of the pointing device 100 and electronic shutter operation of the ring-type CCD.

Hereinafter, synchronization processing between blinking of the light-emission device 60 of the pointing device 100 and electronic shutter operation of the ring-type CCD is described with reference to FIG. 21.

Figure 21:
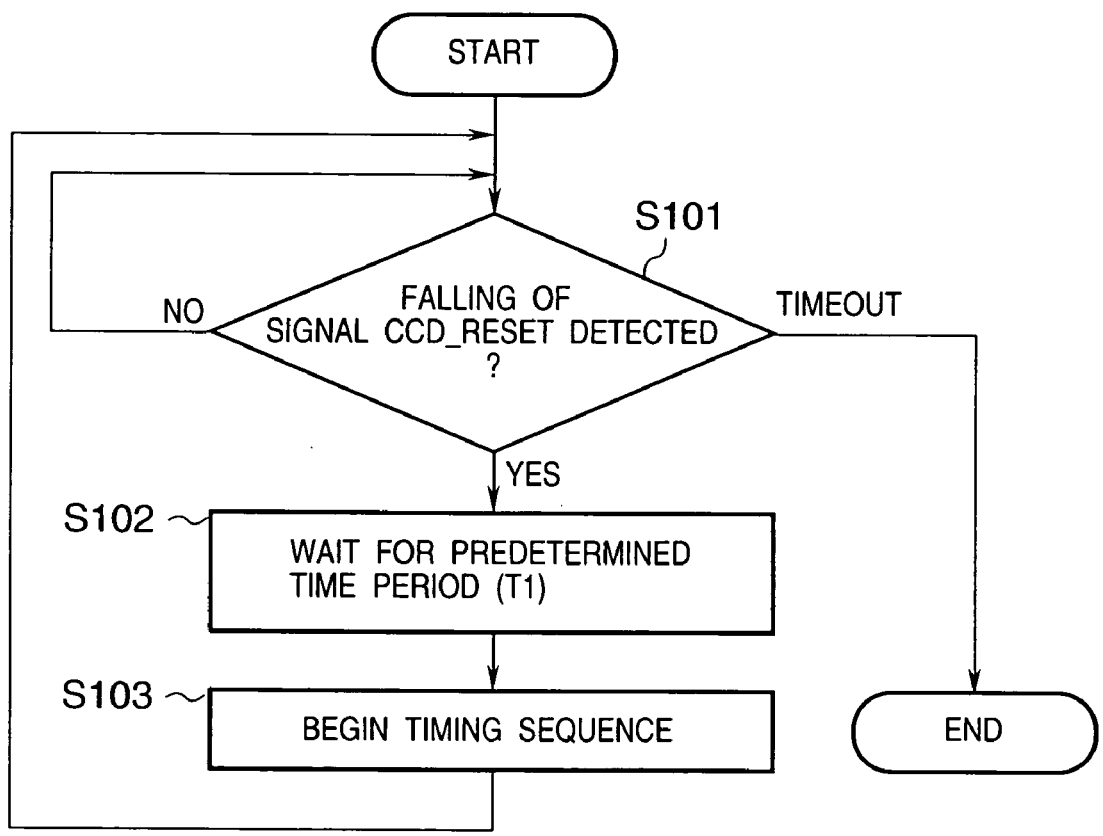
FIG. 21 is a flowchart showing synchronization processing between blinking of the pointing device and electronic shutter operation of the ring-type CCD according to the third embodiment.

FIG. 21 is a flowchart showing the synchronization processing between blinking of the pointing device and electronic shutter operation of the ring-type CCD according to the third embodiment.

According to the synchronization processing of the third embodiment, time adjustment is performed right before the timing sequence shown in FIG. 20 begins, to match the phases of the signal IRCLK and signal LED_IR, and then the signal IRCLK and signal LED_IR are allowed to run freely during the period for one point (i.e., corresponding to one cycle of the timing sequence). Then, after the timing sequence ends, the control stands for detecting falling of the signal CCD_RESET (step S101). Herein, when a falling signal is detected (YES in step S101), the time adjustment is performed again (wait for a predetermined time period T1) to match the phases (step S102), and the next timing sequence is started (step S103).

Herein, a problem of frequency deviation arises between the period of free running and frequencies of the signals IRCLK and LED_CLK. The problem is described hereinafter. In the third embodiment, the cycle of inputting coordinates of a point is set to 40 ms at the maximum. It means that the cycle of signal CCD_RESET in FIG. 20 is 40 ms at the maximum, in other words, the maximum free running period is about 40 ms.

The third embodiment assumes that a quartz resonator is used for the blinking signal generator 3 and CCD_CLK generator 170b. Generally, the frequency precision of most quartz resonator is superior than 100 ppm. Herein, assuming that the frequency precision of the quartz resonator is 100 ppm, phase deviation which may occur during the free running period is 40 ms×100 ppm=4 $\mu$s. This is a sufficiently small value compared to the signal IRCLK cycle (131.6 $\mu$s) or the blinking period 33 $\mu$s.

Accordingly, by virtue of the above-described synchronization processing, the substantial synchronous relation between the signal IRCLK and signal LED_IR is maintained even during the free running period. By virtue of this, the blinking of the light emission device 60 of the pointing device 100 and the electronic shutter operation of the ring-type CCD can be synchronized.

As has been described above, according to the third embodiment, the light emission device 60 of the pointing device 100 emits light at a predetermined frequency, and the light emission is synchronized with the electronic shutter function of the X1 line sensor 90, X2 line sensor 91, and Y line sensor 110 employing a ring-type CCD. Therefore, influence of disturbance light can be eliminated.

Furthermore, in accordance with the amount of light emitted by the pointing device 100, which is received respectively by the X1 line sensor 90, X2 line sensor 91, and Y line sensor 110, charges accumulated in the cyclical charge transfer path employing a ring-type CCD which constitutes each line sensor are controlled, thus allowing each line sensor to have a wide photoreceptive dynamic range.

Moreover, by controlling the X1 line sensor 90, X2 line sensor 91, and Y line sensor 110 based on the blinking timing signal of the pointing device 100 obtained from the T sensor 120, the electronic shutter functions of the X1 line sensor 90, X2 line sensor 91 and Y line sensor 110 can be synchronized with the timing signal. Accordingly, wireless communication between the pointing device 100 and the main unit 130 is realized.

Fourth Embodiment

Figure 22:
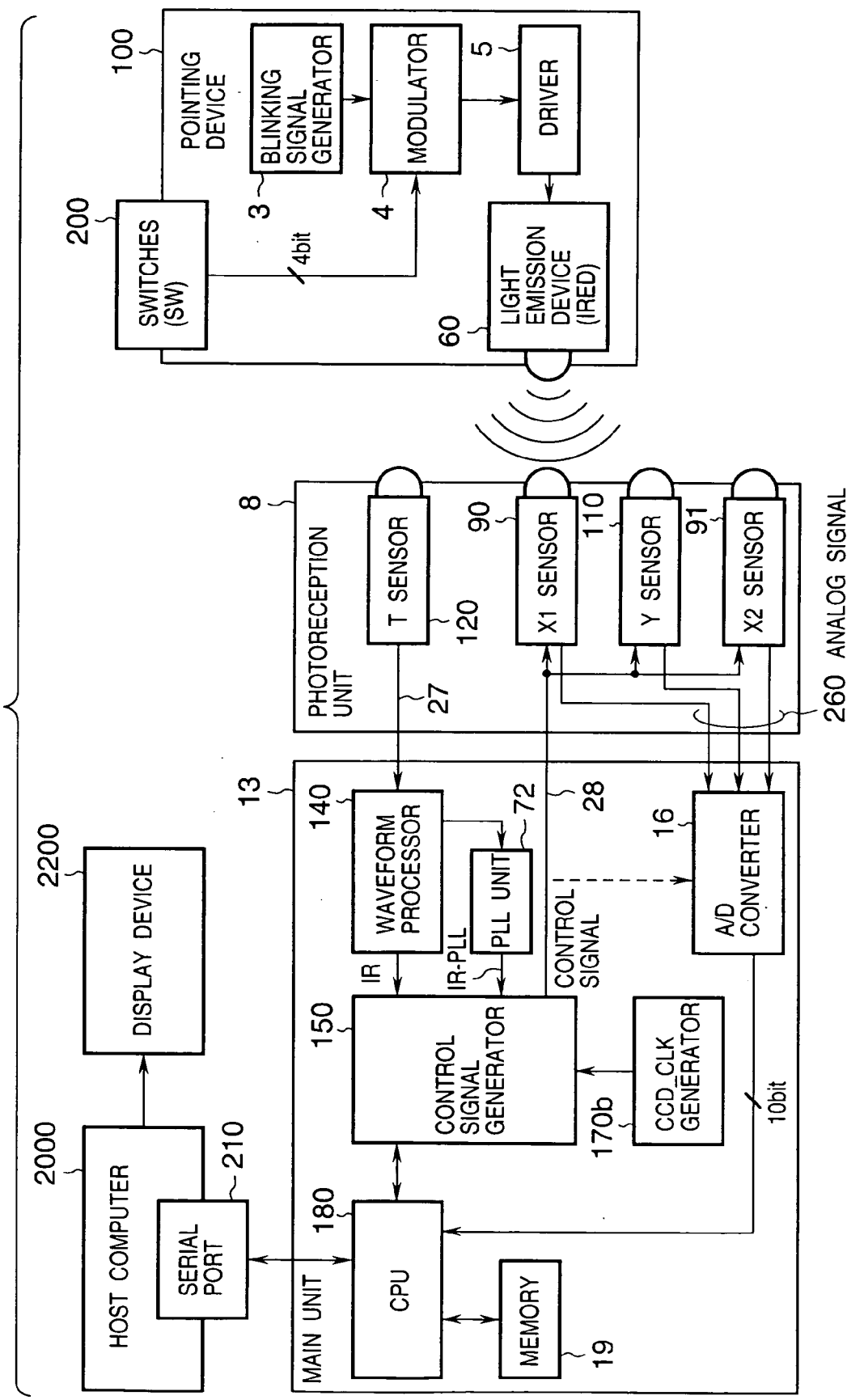
FIG. 22 is a block diagram showing a functional configuration of a three-dimensional coordinate input apparatus according to a fourth embodiment of the present invention.

FIG. 22 is a block diagram showing a functional configuration of the three-dimensional coordinate input apparatus according to the fourth embodiment of the present invention.

Note that with regard to the components similar to those of the third embodiment, the same reference numerals are assigned and detailed description thereof will not be provided herein.

According to the fourth embodiment, in addition to the signal IR transmitted from the waveform processor 140 to the control signal generator 150 as described in the third embodiment, a signal IR_PLL (see FIG. 23) is also transmitted through a phase lock loop (PLL) unit 72.

In the waveform processor 140, a signal transmitted by the T sensor 120 is subjected to a band-pass filter having a resonance circuit which has the same frequency as the carrier frequency described in the third embodiment. By this, signal extraction and disturbance light removal are performed. The above processing is sufficient for removing disturbance light in the normal usage environment.

However, in rare cases, considerably large and unpredictable disturbance light may be incident and the influence may not be completely eliminated. In such case, a pulse-like noise (80, 81 and 82 in FIG. 23) is found in the signal FILTER_OUT outputted by the band-pass filter. This may result in erroneous detection of signal IR. In the case of the third embodiment which detects the beginning or the end of the signal IR to bring synchronization, the erroneous detection of the signal IR may cause malfunction of the apparatus. However, such noise is quite small as an energy to influence the signal. Thus, in the fourth embodiment, the PLL unit 72 is provided for generating a signal IR_PLL (FIG. 23), which is highly resistant to noise, instead of the signal IR. Accordingly, the above problem can be solved.

Fifth Embodiment

The object of the fifth embodiment is to stably extract time axis data from an output signal of the T sensor 120. More specifically, the binarization unit 35 (FIG. 16) which binarizes an output signal of the T sensor 120 is constructed as shown in FIG. 25.

Figure 25:
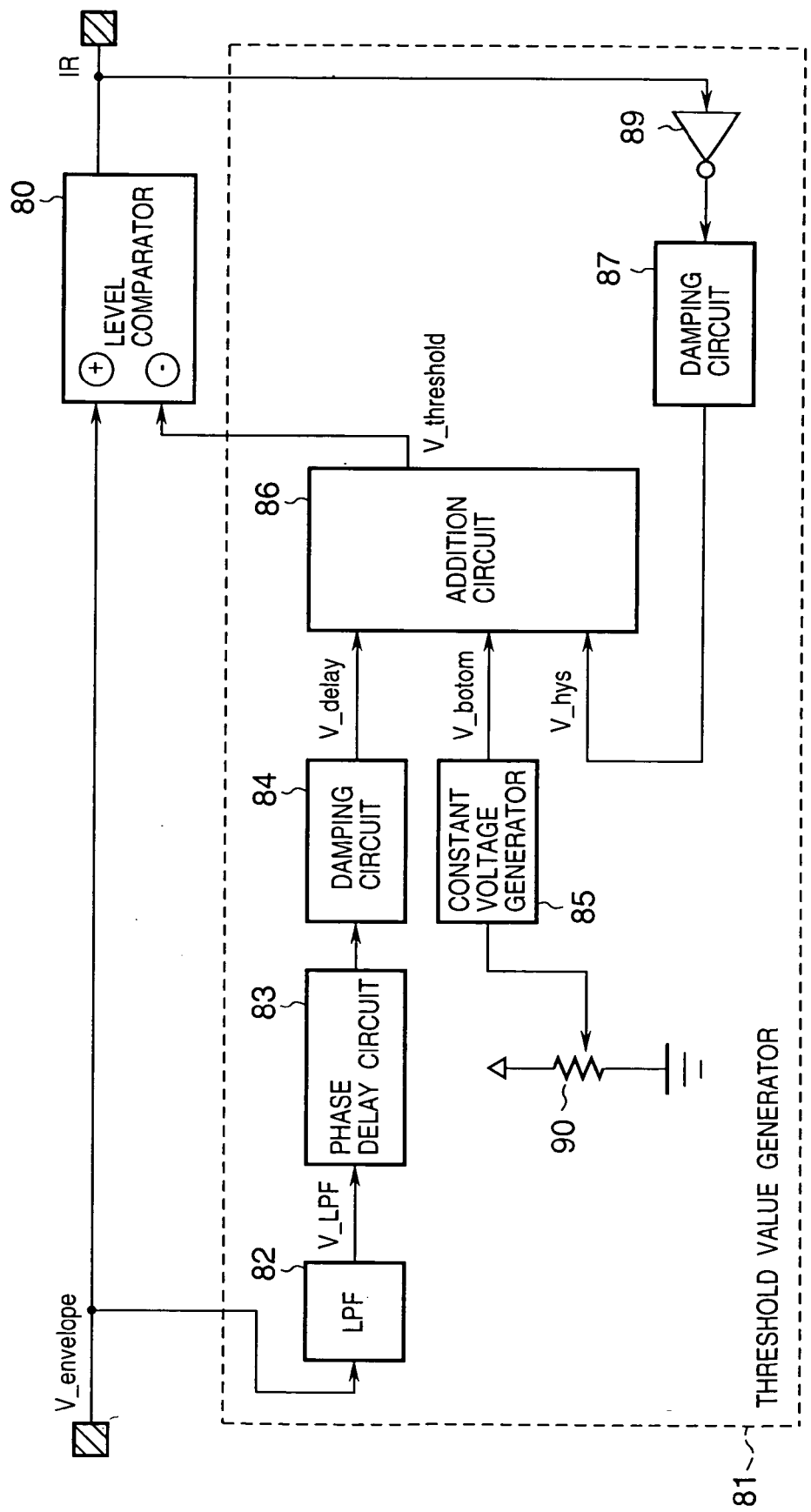
FIG. 25 is a block diagram showing a detailed construction of a binarization unit according to the fifth embodiment.

FIG. 25 is a block diagram showing a detailed construction of the binarization unit according to the fifth embodiment.

Note that the binarization unit 35 of the fifth embodiment performs binarization for extracting a logical signal indicative of time axis data, based on a time axis waveform detected by the T sensor 120.

Figure 24:
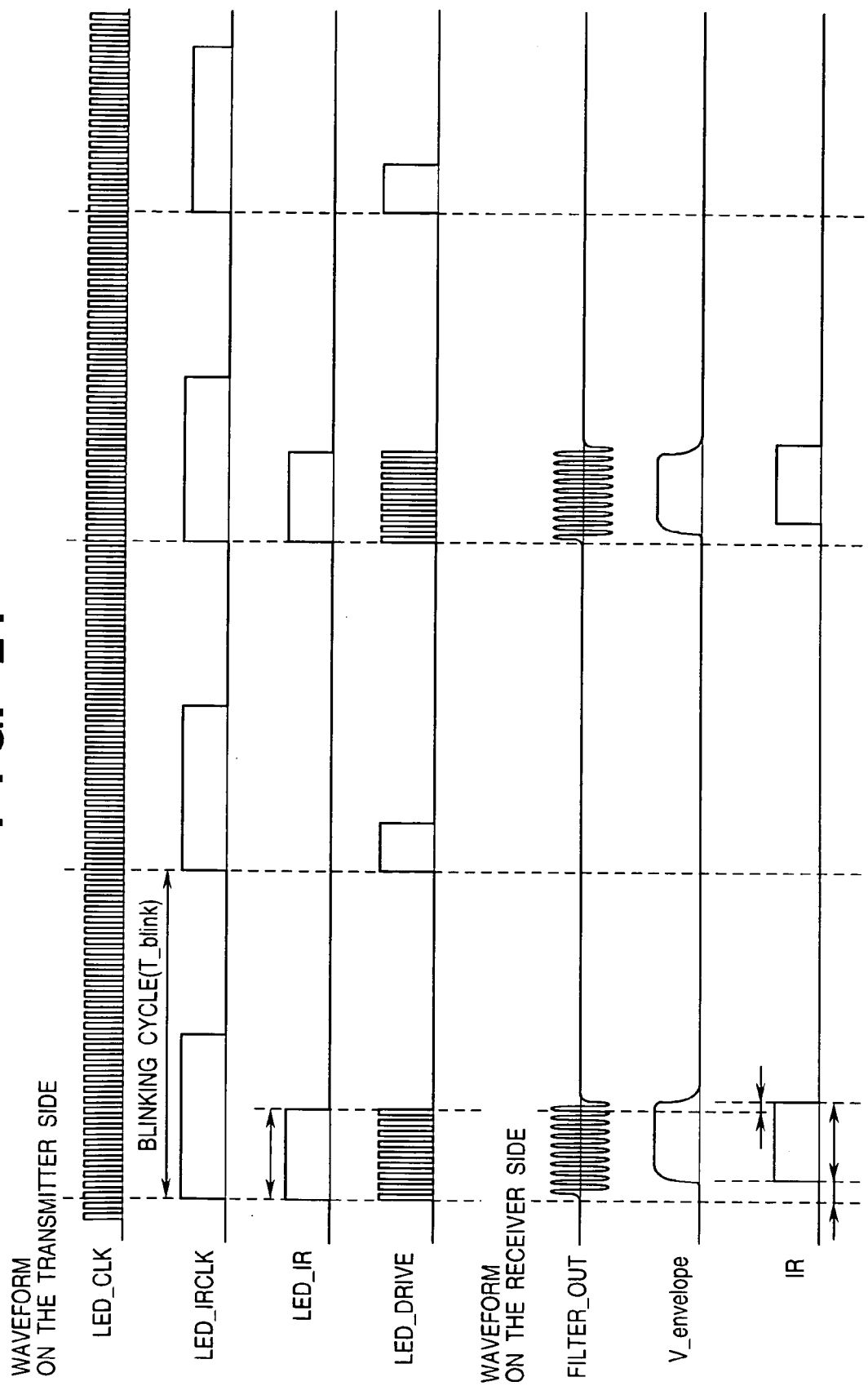
FIG. 24 is a timing chart of signals transmitted and received between the pointing device and main unit according to a fifth embodiment.

Furthermore, relations between the plus-side input and minus-side input to a level comparator 80 of the binarization unit 35 and the output binarized signal are shown in FIGS. 27 to 30. The plus-side input to the level comparator 80 is an input signal which will be referred to as V_envelope (see FIG. 24) (an output of the smoothing unit 34 shown in FIG. 16). The minus-side input to the level comparator 80 is a threshold value signal which will be referred to as V_threshold (an output of a threshold value generator 81 shown in FIG. 25).

Figure 27:
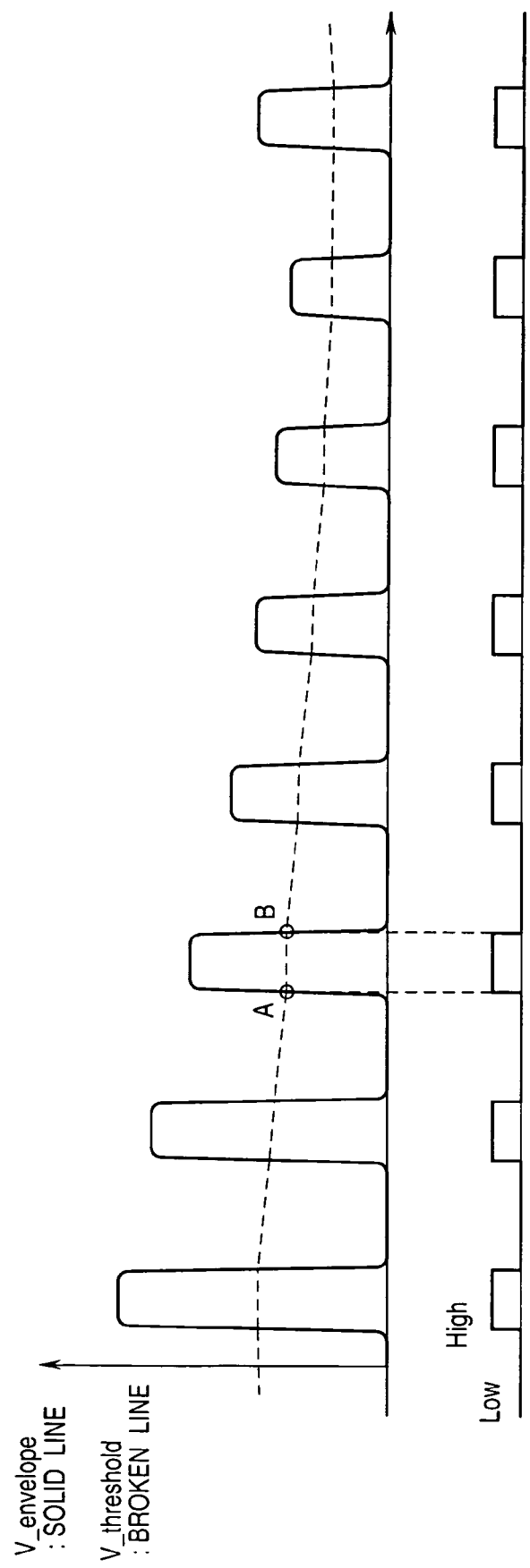
FIG. 27 is a graph showing relations between a threshold value signal and an output signal of T sensor according to the fifth embodiment.

Generally in the binarization unit of this type, in the simplest case, a fixed voltage specified in advance is inputted to the minus-side input of the level comparator 80 as a threshold value signal. In many cases, a threshold value signal which follows the input signal is inputted with a sufficiently large time constant. FIG. 27 shows the relation of V_envelope and V_threshold in the case of having sufficiently large time constant. In this case, the threshold value is set so as to be approximately 50% of the input signal level. Thus, the threshold value signal changes in accordance with a relatively slow variance of an input signal.

In the fifth embodiment, a user points at the photoreception unit 8 with the pointing device 100 which emits an infrared ray. Depending on user's operation, the emission level may largely fluctuate in a short period of time. In actual operation, the time required for such fluctuation is not long enough for the blinking cycle.

A problem raised in the fifth embodiment is the case in which a signal with large fluctuation is inputted to a coordinate input apparatus adopting a threshold value changing in accordance with a sufficiently large time constant. The relation of V_envelope and V_threshold in such case is shown in FIG. 28.

Figure 28:
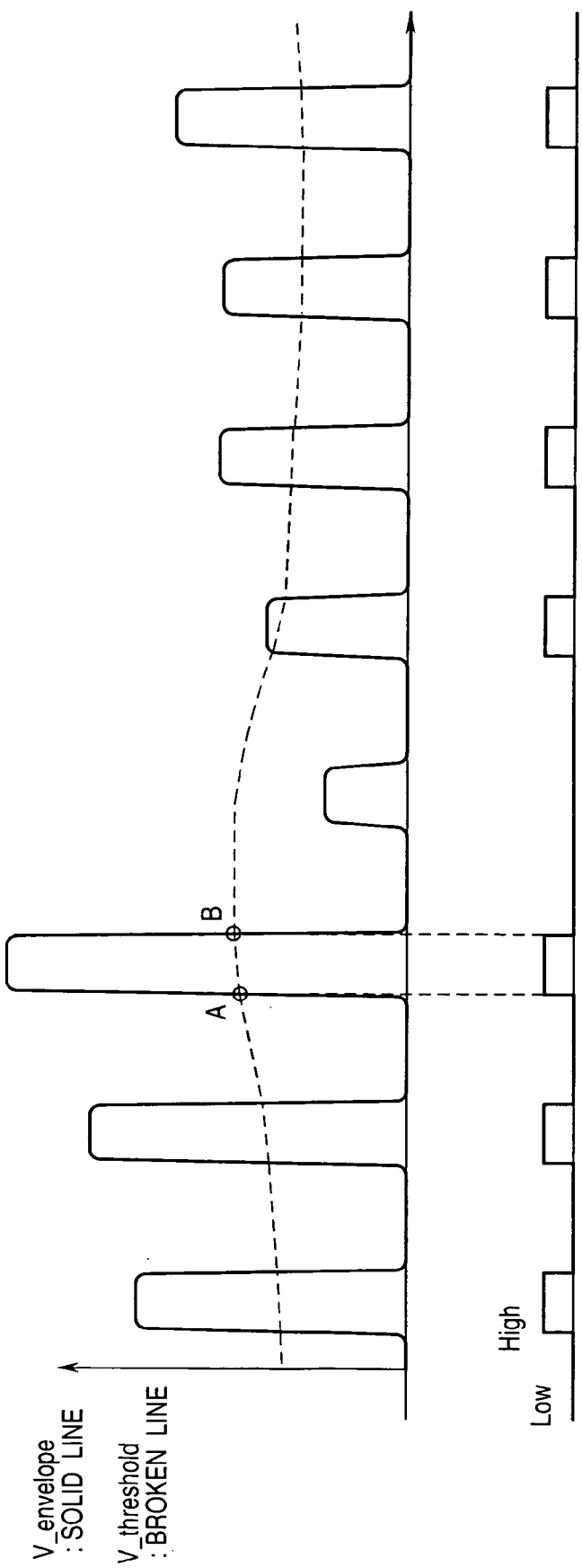
FIG. 28 is a graph showing relations between a threshold value signal and an output signal of T sensor according to the fifth embodiment.

Referring to FIG. 28, the amplitude of the fourth pulse sharply drops to about one third of the third pulse. In this case, as shown in FIG. 28, the threshold value signal cannot follow in time, thus the binarization unit fails to binarize the fourth pulse.

In order to prevent such drawback, according to the fifth embodiment, the time constant for which the threshold value signal changes is set as follows:

$$\tau\_thsh >> \tau\_dtct, \quad \tau\_thsh << T\_blink$$

Herein, $\tau\_thsh$ indicates a time constant for which the threshold value signal changes, $\tau\_dtct$ indicates a time constant for the smoothing unit after wave detection, and T_blink (see FIG. 24) indicates a blinking cycle.

The threshold value of the binarization unit 35 is defined by the following equation:

$$V\_thshold = V\_delay + V\_botom + V\_hys$$

Hereinafter, V_delay, V_botom, and V_hys are described.

V_hys, a widely used signal in the level comparator 80, changes the threshold value signal slightly to the opposite direction in correspondence with the reverse output of the level comparator 80, and serves to cause so-called hysteresis. In reality, the signal is generated through a NOT circuit 89 and damping circuit 87. The NOT circuit 89 and damping circuit 87 serve for anti-oscillation and anti-chattering. Since these functions are generally known to be comprised and not directly related to the present invention, the present invention assume to comprise both functions and detailed description thereof will not be provided. Furthermore, influence of these functions will not be shown in FIGS. 27 to 31.

V_delay is a signal which follows V_envelope. V_delay is obtained as a result of inputting the V_envelope signal to a low-pass filter (LPF) 82, then to a primary phase delay circuit 83, and to the damping circuit 84 for about 40% to 50% damping. Note that the time constant for the low-pass filter (LPF) 82, phase delay circuit 83 and damping circuit 84 altogether is $\tau\_thsh$.

Figure 26:
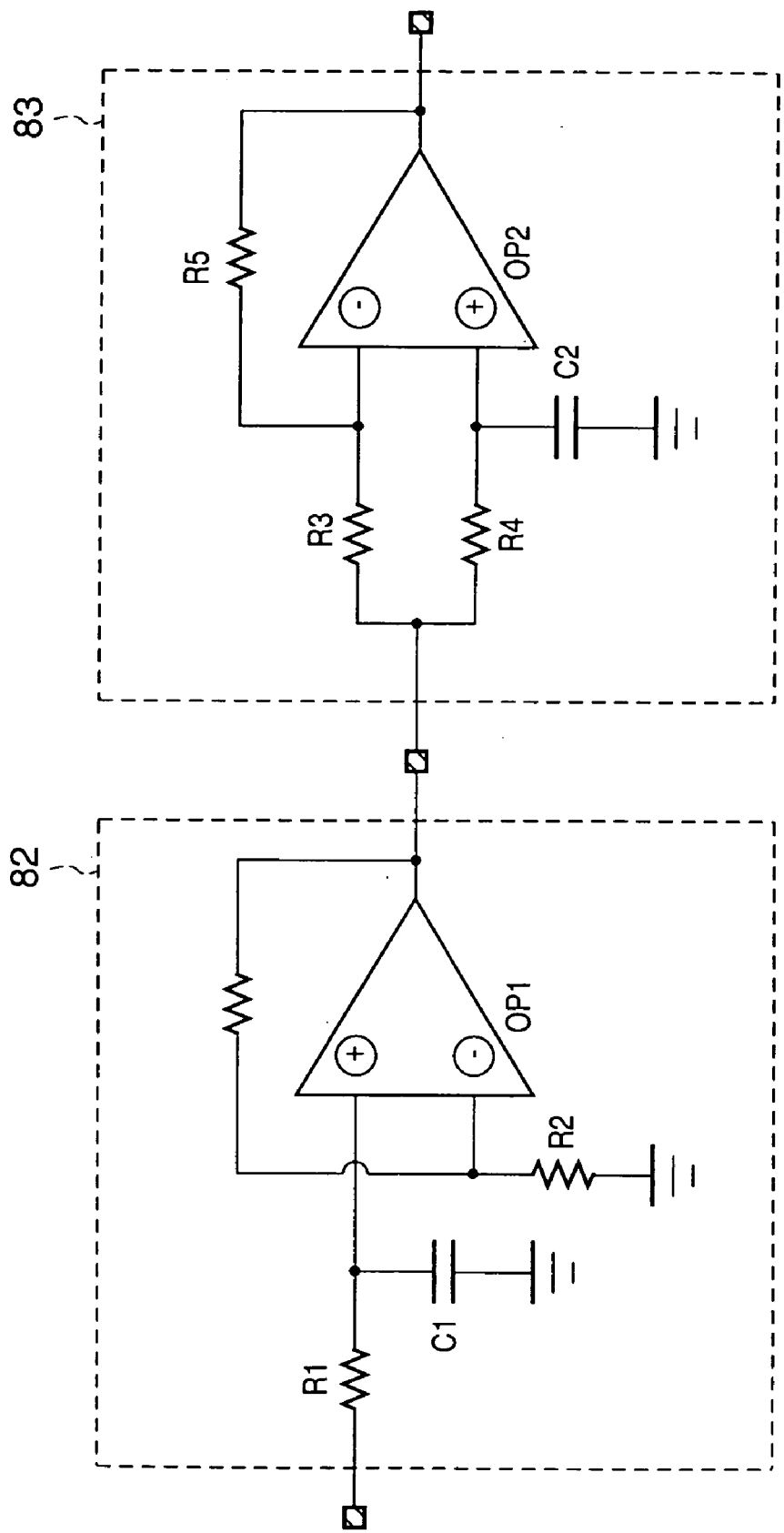
FIG. 26 is a circuit diagram showing a detailed construction of a low-pass filter and a phase delay circuit according to a fifth embodiment.
Figure 30:
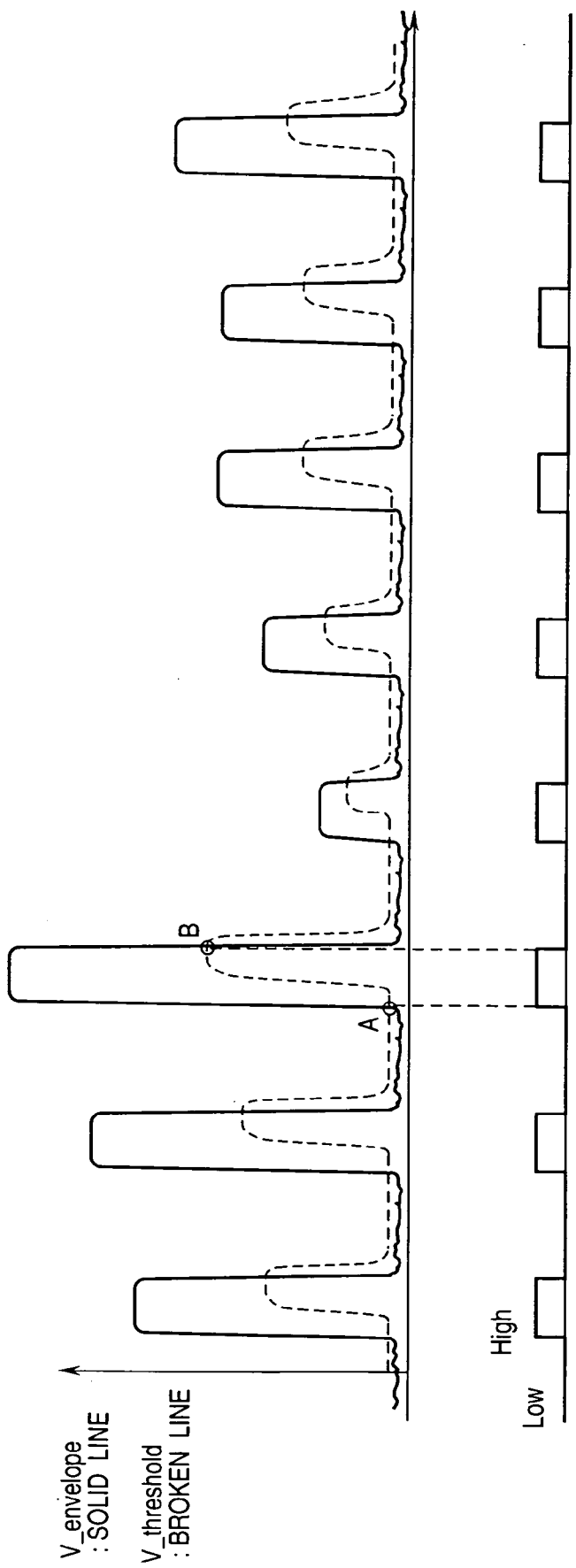
FIG. 30 is a graph showing relations between a threshold value signal and an output signal of T sensor according to the fifth embodiment.

In the fifth embodiment, as shown in FIG. 30, V_delay needs to be delayed from V_envelope by about ⅕ to ⅛ of the T_blink without greatly disturbing the waveform of V_envelope. If the delay is to be realized only by the phase of the low-pass filter, a largely corrupt waveform is obtained. For this reason, the phase delay circuit 83, capable of delaying time only, is employed. Note that FIG. 26 shows detailed constructions of the low-pass filter 82 and phase delay circuit 83.

Figure 29:
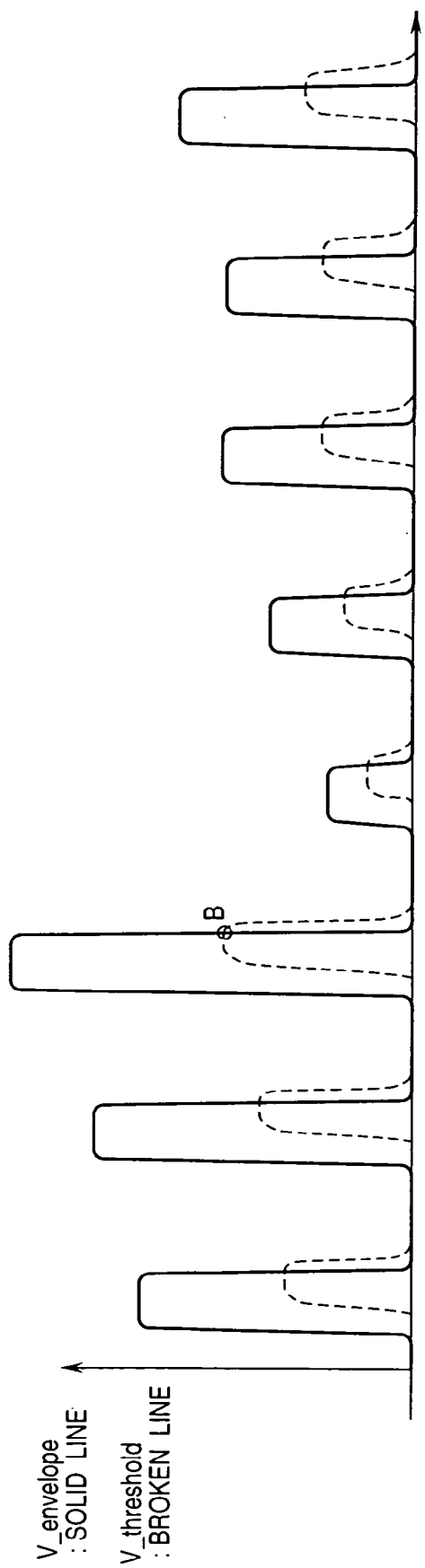
FIG. 29 is a graph showing relations between a threshold value signal and an output signal of T sensor according to the fifth embodiment.
Figure 31:
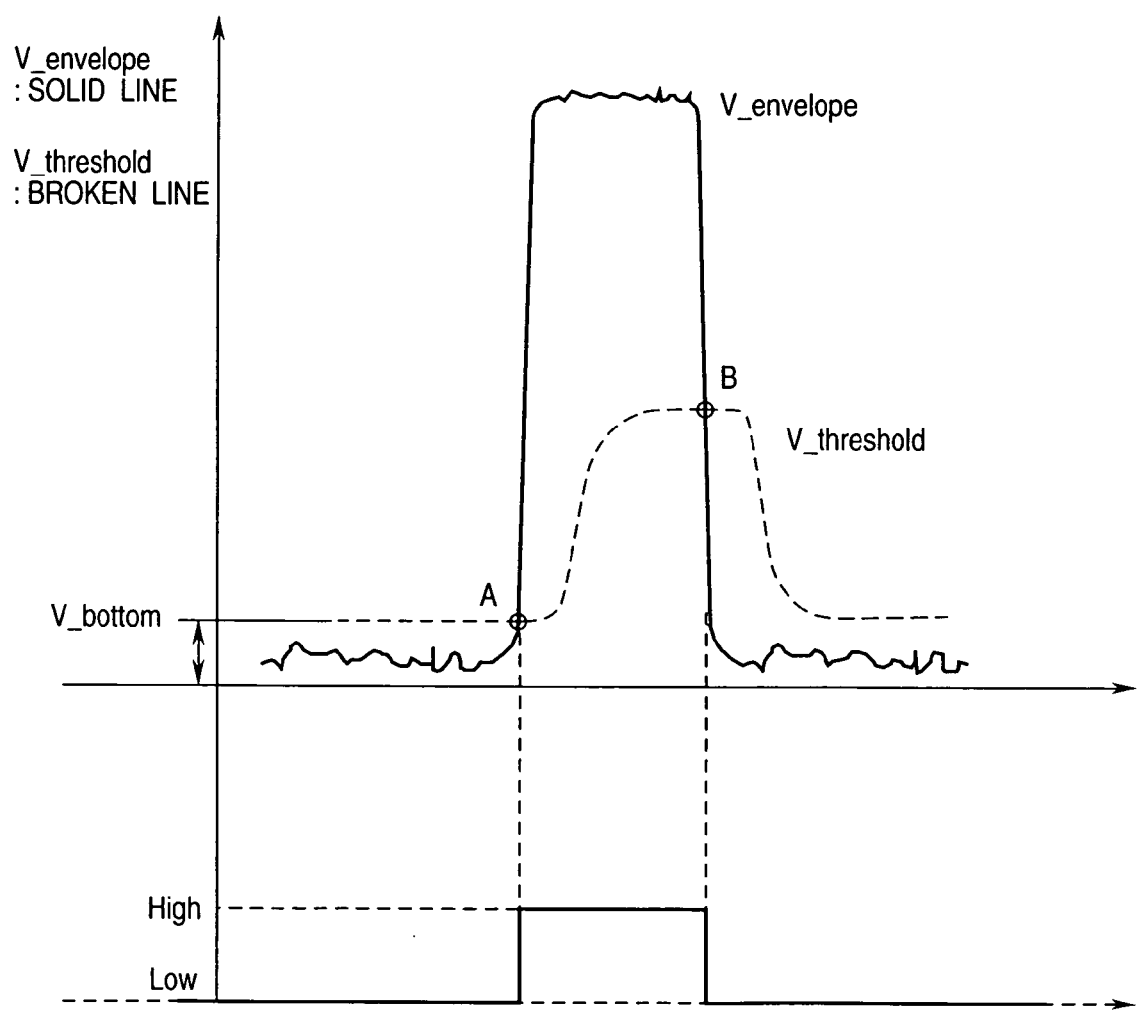
FIG. 31 is a graph showing relations between a threshold value signal and an output signal of T sensor according to the fifth embodiment.

V_botom shown in FIG. 31 is a direct-current-like offset of a threshold value signal, which is generated by a constant voltage generator 85. The reason that the offset is necessary is explained hereinafter. In the fifth embodiment, the time constant of V_delay is $\tau\_delay > T\_blink$. Therefore, as shown in FIG. 29, in the transition where V_envelope~0 stands, V_delay~V_envelope~0 is satisfied.

Therefore, in the transition of V_envelope~0, because which level of V_delay or V_envelope is larger is not clear, the binarization result is affected by noise. Under such circumstance, the binarization result becomes erroneous. In view of the above, the entire threshold value signal is raised to V_botom. By this, even during the transition of V_delay~0, point A can be clearly detected without being affected by noise. In reality, the V_botom value must be sufficiently larger than a noise level during the transition, of V_envelope~0, and must be sufficiently smaller than V_envelope value in the minimum detection level and the V_delay value corresponding to the V_envelope value. FIG. 30 shows the result of binarization with the foregoing conditions.

Since the construction and detailed configuration of the ring-type CCD are the same as that of the first and third embodiments, the description will not be provided herein.

As has been set forth above, according to the fifth embodiment, when an output signal of the T sensor 12 is binarized, the threshold value signal is appropriately changed with a predetermined time constant and the lower limit of the threshold value is set to a predetermined value. By virtue of this, even in an environment of a lot of noise or even if the pointing device 1 is operated roughly, time axis data can be stably obtained from the output signal of the T sensor 12. As a result, stable operation of three-dimensional coordinate input is realized even if there are a lot of noise or if the pointing device 1 is operated roughly.

Sixth Embodiment

Figure 32:
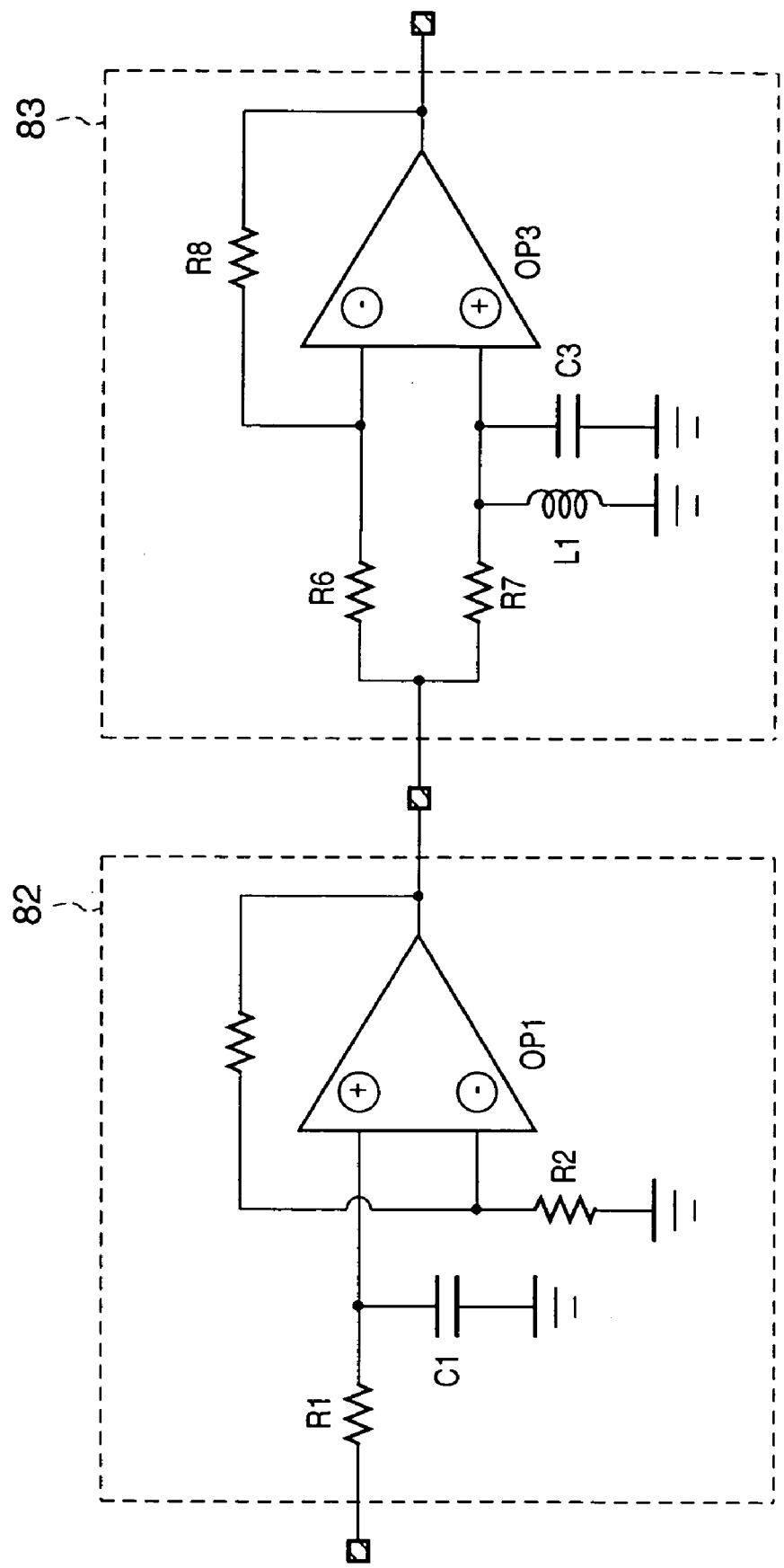
FIG. 32 is a circuit diagram showing a detailed construction of a low-pass filter and a phase delay circuit according to a sixth embodiment.

According to the sixth Embodiment, a modification of the binarization unit 35 is employed. More specifically, a secondary phase delay circuit is employed as the phase delay circuit 83 to delay the signal V_delay from the V_envelope as described above. Detailed construction of the secondary phase delay circuit is shown in FIG. 32.

By utilizing the phase delay circuit 83, the resonance frequency of the secondary phase delay circuit and resonance Q can be appropriately controlled, thus enabling fine shaping of the waveform of V_delay. In other words, binarization processing can be performed with a large noise margin and less noise jittering, and a stable signal IR is generated. As a result, steady three-dimensional coordinate input is realized.

Seventh Embodiment

Although the foregoing processing in the first to sixth embodiments has been described for a coordinate input apparatus which inputs three-dimensional coordinates, it can also be applied to a coordinate input apparatus which inputs two-dimensional coordinates. Hereinafter, as the seventh embodiment, a construction of a two-dimensional coordinate input apparatus is described with reference to FIG. 33.

Figure 33:
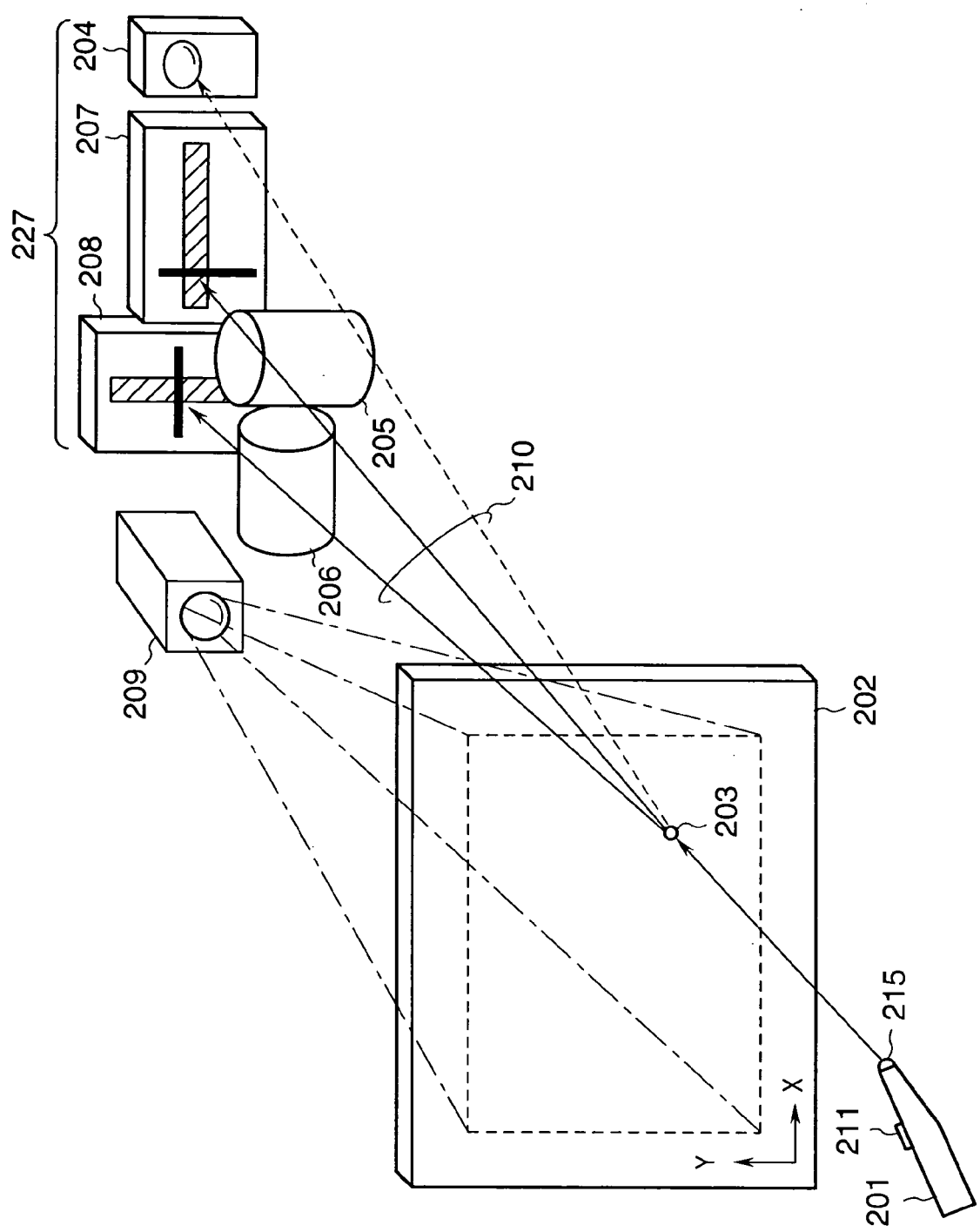
FIG. 33 is an external appearance of a coordinate input apparatus according to a seventh embodiment of the present invention.
Figure 34:
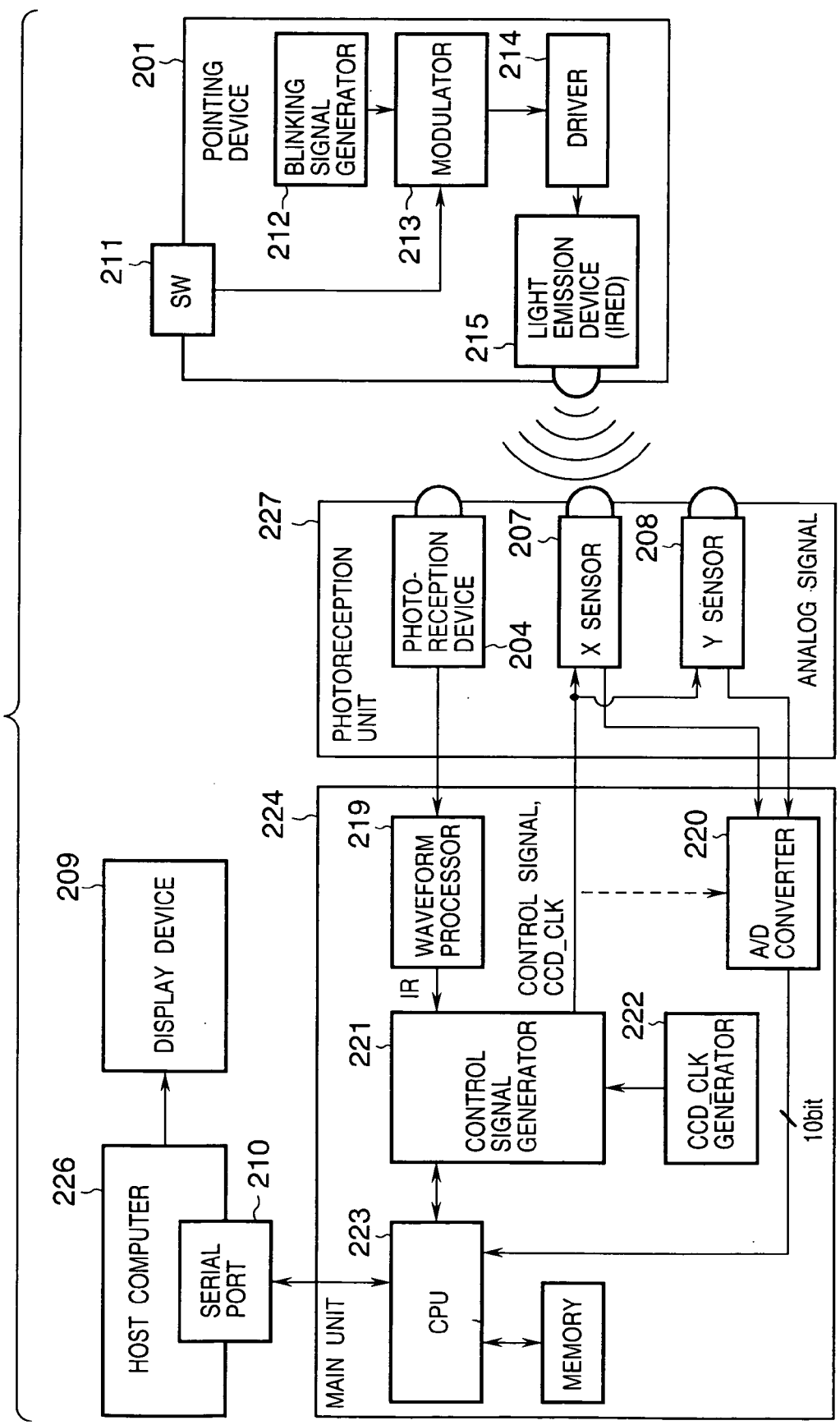
FIG. 34 is a block diagram showing a functional configuration of the coordinate input apparatus according to the seventh embodiment of the present invention.

FIG. 33 is an external appearance of the coordinate input apparatus according to the seventh embodiment. FIG. 34 is a block diagram showing a functional configuration of the coordinate input apparatus according to the seventh embodiment.

Note that the functional configuration of the coordinate input apparatus according to the seventh embodiment is mostly the same as that of the coordinate input apparatus according to the third embodiment shown in FIG. 13. However, they are different in the way that the processing subject is a two-dimensional coordinate signal in the seventh embodiment as supposed to a three-dimensional coordinate signal in the third embodiment. In the case of detecting two-dimensional coordinates, it is necessary to comprise only one of the above-described two X line sensors provided in the X-axis direction for detecting coordinate Z of the three-dimensional coordinates (X, Y, Z). Thus, the functional configuration of the coordinate input apparatus according to the seventh embodiment includes only one line sensor in the X-axis direction as shown in FIGS. 33 and 34.

A brief structure of the coordinate input apparatus according to the seventh embodiment shown in FIG. 34 is described with reference to FIG. 33.

The coordinate input apparatus of the seventh embodiment mainly comprises: a pointing device 201 which forms a light spot 203 on a screen 202 serving as a coordinate input surface; a photoreception unit 227 which detects a coordinate position of the light spot 203 generated on the screen 202 by light emission of the pointing device 201; and a main unit 224 which controls the photoreception unit 227 and calculates coordinate data based on an electric signal obtained by photoelectric conversion of the light received by the photoreception unit 227.

FIG. 33 also shows a projection-type display device 209 in addition to the above-described coordinate input apparatus, which displays the coordinate position on the screen 202 by echoing back coordinate position data (cursor position, locus and so forth) designated by the pointing device 201.

The pointing device 201 on the light emission side comprises: a light emission device 215 such as a semiconductor laser or an LED which irradiate a light beam; a modulator 213 which generates a light emission pattern of the light emission device 215; a driver 214 which drives the light emission device 215; and a switch 211 for inputting auxiliary data such as pen-up/pen-down states or the like.

Hereinafter, the pen-up/pen-down states are described. When a general writing device (pen), such as a ball-point pen or a pencil, is used to write a locus or the like on paper, the pen is brought into contact with the paper and moved around on the paper. The state in which the pen comes into contact with the paper is referred to as _pen-down_, and the state in which the pen being in contact with the paper is moved away from the paper is referred to as _pen-up_. Such expression used in the general writing device is applicable to an electrical pen (e.g., the pointing device 201 employed in the seventh embodiment).

Note that in the case of an electrical pen, being able to write a locus is not necessarily the same state as being in contact with the display surface. It is rather accurate to consider the pen-down/pen-up as the functions changed by a switch (switch 211 in the seventh embodiment), wherein the state of being able to write a locus is pen-down and the state of not being able to write a locus is pen-up. In order to facilitate the usage of such electrical pen, a cursor or the like may be displayed on the display screen to indicate the position of the pen even during the pen-up state.

The photoreception unit 227 comprises: an X line sensor 207; a cylindrical lens 205 which focuses the light spot 203 on a pixel-array surface of the X line sensor 207; a Y line sensor 208; a cylindrical lens 206 which focuses the light spot 203 on a pixel-array surface of the Y line sensor 208; and a photoreception device 204 serving as the second photoreceptor. Herein, the X line sensor 207 and Y line sensor 208 are so-called ring-type CCDs which respectively detect the X-axis coordinate position and Y-axis coordinate position of the light spot 203. The X line sensor 207 and Y line sensor 208 are controlled respectively by a predetermined timing sequence generated by a control signal generator 221.

Electric signals obtained from the X line sensor 207 and Y line sensor 208 which serve as the first photoreceptor are converted to digital signals by an analog/digital (A/D) converter 220. Based on the digital signals outputted by the A/D converter 220, a CPU 223 calculates coordinate data of the light spot 203 and outputs the calculated coordinate data to a host computer 226.

The photoreception device 204 of the photoreception unit 227 is a photoelectric transducer detecting a single pixel. The photoreception device 204 is a synchronization photoreceptor used for detecting in the light spot 203, time axis data of emitted light. Note that the photoreception device 204 corresponds to the T sensor 120 of the third embodiment shown in FIG. 13.

A signal outputted by the photoreception device 204 is subjected to a predetermined band-pass filter in a waveform processor 219. A signal outputted by the band-pass filter is subjected to general full-wave rectification, smoothing, and binarization. Then, the resultant signal IR is transmitted to the control signal generator 221.

The control signal generator 221 determines the inputted signal IR according to a predetermined condition to detect auxiliary data sent by the pointing device 201, and detects a rising timing or falling timing of the signal IR. When a predetermined time period lapses after the detected timing, a reset signal RESET is generated. The reset signal RESET is sent to the X line sensor 207 and Y line sensor 208 to trigger the timing sequence which controls these line sensors. The timing sequence is executed each time coordinate data for one point of the light spot 203 is inputted.

Note that since details of each component of the coordinate input apparatus shown in FIG. 34, including the components of the third embodiment shown in FIG. 13, have already been described in the foregoing embodiments, description will not be provided herein.

As has been set forth above, according to the seventh embodiment, the coordinate input apparatus for inputting two-dimensional coordinate data also achieves the above-described effects of the first to sixth embodiments.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus, reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. A coordinate input apparatus for inputting three-dimensional coordinates, comprising:

designation means, having a light emission device, for designating a three-dimensional position, a plurality of line sensors for receiving light emitted by the light emission device and determining a three-dimensional position where the light emission device exists;

a photoreception device for receiving light emitted by the light emission device;

calculation means for calculating three-dimensional coordinates of a position where said designation means exists, based on a determined value obtained by said plurality of line sensors; and synchronization means for synchronizing a light emission cycle of the light emission device with a photoreception cycle of said line sensors based on a signal outputted by said photoreception device, wherein the light emission device emits light in a predetermined cycle, each of said plurality of line sensors comprises an electronic shutter function, and the electronic shutter function is turned on and off with a phase synchronous with the light emission cycle of the light emission device or a cycle which is an integral multiple of the light emission cycle, wherein said designation means includes a plurality of switches, the light emission device emits light based on one of a plurality of different modulation signals modulated by a carrier frequency higher than the predetermined cycle, and selection from the plurality of different modulation signals is made by the plurality of switches, wherein said synchronization means comprises generation means for generating a group of signals representing auxiliary data, indicative of time axis data of a signal from the light emission device and switch data for the plurality of switches of said designation means, based on a signal obtained by inputting a signal from the photoreception device to a band-pass filter having the same frequency characteristic as the carrier frequency, and based on the group of signals generated by the generation means, the light emission cycle of the light emission device and the photoreception cycle of said plurality of line sensors are synchronized, wherein said synchronization means executes a timing sequence, serving as a control signal of said plurality of line sensors, by referring to an arbitrary light-on timing of the light emission device obtained by the group of signals, and repeats the timing sequence each time coordinate data for a point is processed.

2. The coordinate input apparatus according to claim 1, wherein said plurality of line sensors comprise:

a line sensor arranged in a first direction; and a line sensor arranged in a second direction which is perpendicular to the first direction, wherein at least one of the first or second direction includes a plurality of line sensors.

3. The coordinate input apparatus according to claim 1, wherein said calculation means calculates relative three-dimensional coordinates of said designation means with respect to the plurality of line sensors, based on a plurality of two-dimensional data and difference between the two-dimensional data determined by said plurality of line sensors.

4. The coordinate input apparatus according to claim 1, wherein each of said plurality of line sensors is a ring-type CCD comprising a cyclical charge transfer path constructed with a plurality of cells,
wherein each charge is simultaneously transferred from arbitrary photoelectric transducers arranged in line to the cyclical charge transfer path and circulated in the cyclical charge transfer path in a cycle synchronous with turning on and off the electronic shutter function, and each time the charge circulates once, new charge is added from the same photoelectric transducer and accumulated.

5. The coordinate input apparatus according to claim 4, wherein in each of said plurality of line sensors, a signal reader is connected to a cell of the cyclical charge transfer path, and outputs a voltage proportional to a charge passing the cell to an external unit.

6. The coordinate input apparatus according to claim 5, wherein the signal reader reads out a voltage proportional to a difference between charges of two adjacent cells.

7. The coordinate input apparatus according to claim 4, wherein the electronic shutter function is turned on at each timing of light-on and light-off of the light emission device, and transfers charges accumulated at each timing to an adjacent cell in the cyclical charge transfer path.

8. The coordinate input apparatus according to claim 4, wherein in said plurality of line sensors, a control for circulating a charge while accumulating charges by turning on and off the electronic shutter function, and a control for circulating a charge while halting the accumulation of charges by turning off the electronic shutter function, are executed by an external unit.

9. The coordinate input apparatus according to claim 4, wherein in said plurality of line sensors, a number of times of accumulation of the charge is controlled in accordance with a received amount of light which has been emitted by the light emission device.

10. A control method of a coordinate input apparatus for inputting three-dimensional coordinates, comprising the steps of:
receiving light, emitted by a designation device having a light emission device, with a plurality of line sensors and determining a three-dimensional position where the light emission device exists;
receiving light, emitted by the light emission device, with a photoreception device;
calculating three-dimensional coordinates of a position where the light emission device exists, based on a determined value obtained in said determining step;
synchronizing a light emission cycle of the light emission device with a photoreception cycle of the line sensors based on a signal outputted by said photoreception device,
wherein the light emission device emits light in a predetermined cycle, each of said plurality of line sensors comprises an electronic shutter function, and the electronic shutter function is turned on and off with a phase synchronous with the light emission cycle of the light emission device or a cycle which is an integral multiple of the light emission cycle,
wherein said designation device includes a plurality of switches,
the light emission device emits light based on one of a plurality of different modulation signals modulated by a carrier frequency higher than the predetermined cycle, and
selection from the plurality of different modulation signals is made by the plurality of switches,
wherein said synchronizing step comprises a step of generating a group of signals representing auxiliary data, indicative of time axis data of a signal from the light emission device and switch data for the plurality of switches based on a signal obtained by inputting a signal from the photoreception device to a band-pass filter having the same frequency characteristic as the carrier frequency, and
based on the group of signals generated in the generation step, the light emission cycle of the light emission device and the photoreception cycle of the plurality of line sensors are synchronized,
wherein in said synchronizing step, a timing sequence, serving as a control signal of said plurality of line sensors, is executed by referring to an arbitrary light-on timing of the light emission device obtained by the group of signals, and the timing sequence is repeated each time coordinate data for a point is processed.

11. The control method of a coordinate input apparatus according to claim 10, wherein said plurality of line sensors comprise:
a line sensor arranged in a first direction; and
a line sensor arranged in a second direction which is perpendicular to the first direction,
wherein at least one of the first or second direction includes a plurality of line sensors.

12. The control method of a coordinate input apparatus according to claim 10, wherein in said calculation step, relative three-dimensional coordinates of the light emission device with respect to the plurality of line sensors are calculated based on a plurality of two-dimensional data and difference between the two-dimensional data determined in said determining step.

13. The control method of a coordinate input apparatus according to claim 10, wherein each of said plurality of line sensors is a ring-type CCD comprising a cyclical charge transfer path constructed with a plurality of cells,
wherein each charge is simultaneously transferred from arbitrary photoelectric transducers arranged in line to the cyclical charge transfer path and circulated in the cyclical charge transfer path in a cycle synchronous with turning on and off the electronic shutter function, and each time the charge circulates once, new charge is added from the same photoelectric transducer and accumulated.

14. The control method of a coordinate input apparatus according to claim 13, wherein in each of said plurality of line sensors, a signal reader is connected to a cell of the cyclical charge transfer path, and outputs a voltage proportional to a charge passing the cell to an external unit.

15. The control method of a coordinate input apparatus according to claim 14, wherein the signal reader reads out a voltage proportional to a difference between charges of two adjacent cells.

16. The control method of a coordinate input apparatus according to claim 13, wherein the electronic shutter function is turned on at each timing of light-on and light-off of the light emission device, and transfers charges accumulated at each timing to an adjacent cell in the cyclical charge transfer path.

17. The control method of a coordinate input apparatus according to claim 13, wherein in said plurality of line sensors, a control for circulating a charge while accumulating charges by turning on and off the electronic shutter function, and a control for circulating a charge while halting the accumulation of charges by turning off the electronic shutter function, are executed by an external unit.

18. The control method of a coordinate input apparatus according to claim 13, wherein in the plurality of line sensors, a number of times of accumulation of the charge is controlled in accordance with a received amount of light which has been emitted by the light emission device.

19. A computer-readable memory storing program codes for controlling a coordinate input apparatus which inputs three-dimensional coordinates in a space including said coordinate input apparatus and a host device, said memory comprising:

program codes for a receiving step of receiving light, emitted by a designation device having a light emission device, with a plurality of sensors and a photoreception device;

program codes for a calculation step of calculating and determining an absolute three-dimensional position, in the three-dimensional coordinates, of the light emission device with regard to said coordinate input apparatus based on values corresponding to positions where the light is emitted on said plurality of sensors;

program codes for a synchronizing step of synchronizing a light emission cycle of the light emission device with a photoreception cycle of the sensors based on a signal outputted by said photoreception device; and program codes for transferring the absolute three-dimensional position to said host devices, wherein the light emission device emits light in a predetermined cycle, each of said plurality of sensors comprises an electronic shutter function, and the electronic shutter function is turned on and off with a phase synchronous with the light emission cycle of the light emission device or a cycle which is an integral multiple of the light emission cycle, wherein said designation device includes a plurality of switches, the light emission device emits light based on one of a plurality of different modulation signals modulated by a carrier frequency higher than the predetermined cycle, and selection from the plurality of different modulation signals is made by the plurality of switches, wherein said synchronizing step comprises a step of generating a group of signals representing auxiliary data, indicative of time axis data of a signal from the light emission device and switch data for the plurality of switches, based on a signal obtained by inputting a signal from the photoreception device to a band-pass filter having the same frequency characteristic as the carrier frequency, and based on the group of signals generated in the generation step, the light emission cycle of the light emission device and the photoreception cycle of the plurality of sensors are synchronized, wherein in said synchronizing step, a timing sequence, serving as a control signal of said plurality of sensors, is executed by referring to an arbitrary light-on timing of the light emission device obtained by the group of signals, and the timing sequence is repeated each time coordinate data for a point is processed.

20. A coordinate input apparatus for detecting a position of a light spot with regard to said coordinate input apparatus, generated on a predetermined two-dimensional coordinate surface with light emitted by a designation device which emits light in a predetermined blinking cycle, and for outputting detected coordinate data, said apparatus comprising:

a first photoreception sensor for detecting from the light spot, a light emission position in two-dimensional direction;

a second photoreception sensor for detecting from the light spot, time series variance of light emitted;

synchronization control means for synchronizing detection operation of said first photoreception sensor with the blinking cycle of light in the light spot based on the time series variance of the light spot detected by said second photoreception sensor; and calculation means for calculating coordinates of the position of the light spot relative to said coordinate input apparatus, generated on the two-dimensional coordinate surface, based on a signal outputted from said first photoreception sensor brought to a synchronous state by said synchronization control means, wherein each time coordinate data of the light spot for a point is processed, said synchronization control means detects a light-on period start timing or end timing in the blinking cycle of light in the light spot based on the time series variance of the light spot detected by said second photoreception sensor and synchronizes detection operation of said first photoreception sensor with a timing which has been deviated from the detected timing by a predetermined time period.

21. The coordinate input apparatus according to claim 20, wherein said first photoreception sensor includes two line sensors arranged in two directions which are not parallel.

22. The coordinate input apparatus according to claim 21, wherein each of the line sensors is a ring-type CCD having a photoelectric transducer and a ring-shaped charge transfer path capable of consecutively adding and accumulating a charge generated in the photoelectric transducer, said synchronization control means controls the ring-type CCD such that the photoelectric transducer performs photoelectric conversion in synchronization with the blinking cycle of light in the light spot, and that a charge generated by the photoelectric conversion is circulated in the charge transfer path and is consecutively added and accumulated in synchronization with the blinking cycle, and said calculation means sequentially reads out the charge accumulated in the charge transfer path as an electric signal, and based on difference of the read electric signals, calculates coordinates of the position of the light spot generated on the two-dimensional coordinate surface.

23. The coordinate input apparatus according to claim 22, wherein said synchronization control means changes a period of adding and accumulating the charge, generated in the photoelectric transducer, in the charge transfer path in accordance with the amount of light in the light spot.

24. The coordinate input apparatus according to claim 20, wherein the designation device comprises modulation means for modulating a light-on cycle of blinking light by a carrier frequency sufficiently higher than a blinking frequency, and said synchronization control means comprises a waveform processor which inputs an electric signal, representing the light spot detected by said second photoreception sensor, to a band-pass filter having substantially the same resonance frequency characteristic as the carrier frequency, to extract only a frequency component substantially the same as the carrier frequency included in the electric signal.

25. The coordinate input apparatus according to claim 20, wherein the designation device further comprises an operation switch and modulation control means for controlling said modulation means to modulate or not modulate according to operation of the switch, and said synchronization control means comprises detection means for detecting an operation state of the switch by determining whether or not modulation has been performed by said modulation means based on a time series variance of the electric signal representing the light spot detected by said second photoreception sensor.

26. A control method of a coordinate input apparatus which detects a position of a light spot with regard to said coordinate input apparatus, generated on a predetermined two-dimensional coordinate surface with light emitted by a designation device which emits light in a predetermined blinking cycle, and outputs detected coordinate data, said method comprising:

a first detection step of detecting from the light spot, a light emission position in two-dimensional direction, by using a first photoreception sensor;

a second detection step of detecting from the light spot, time series variance of light emitted, by using a second photoreception sensor;

a synchronization control step of synchronizing detection operation of the first photoreception sensor with the blinking cycle of light in the light spot based on the time series variance of the light spot detected by the second photoreception sensor; and a calculation step of calculating coordinates of the position of the light spot relative to said coordinate input apparatus, generated on the two-dimensional coordinate surface, based on a signal outputted from said first photoreception sensor brought to a synchronous state by said synchronization control step, wherein in said synchronization control step, each time coordinate data of the light spot for a point is processed, a light-on period start timing or end timing in the blinking cycle of light in the light spot is detected based on the time series variance of the light spot detected by the second photoreception sensor and detection operation of the first photoreception sensor is synchronized with a timing which has been deviated from the detected timing by a predetermined time period.

27. The control method of the coordinate input apparatus according to claim 26, wherein the first photoreception sensor includes two line sensors arranged in two directions which are not parallel.

28. The control method of the coordinate input apparatus according to claim 27, wherein each of the line sensors is a ring-type CCD having a photoelectric transducer and a ring-shaped charge transfer path capable of consecutively adding and accumulating a charge generated in the photoelectric transducer, in said synchronization control step, the ring-type CCD is controlled such that the photoelectric transducer performs photoelectric conversion in synchronization with the blinking cycle of light in the light spot, and that a charge generated by the photoelectric conversion is circulated in the charge transfer path and is consecutively added and accumulated in synchronization with the blinking cycle, and in said calculation step, the charge accumulated in the charge transfer path is sequentially read out as an electric signal, and based on difference of the read electric signals, coordinates of the position of the light spot generated on the two-dimensional coordinate surface are calculated.

29. The control method of the coordinate input apparatus according to claim 28, wherein in said synchronization control step, a period of adding and accumulating the charge, generated in the photoelectric transducer, in the charge transfer path is changed in accordance with the amount of light in the light spot.

30. The control method of the coordinate input apparatus according to claim 26, wherein the designation device comprises a modulator for modulating a light-on cycle of blinking light by a carrier frequency sufficiently higher than a blinking frequency, and said synchronization control step comprises a waveform processing step of inputting an electric signal, representing the light spot detected by the second photoreception sensor, to a band-pass filter having substantially the same resonance frequency characteristic as the carrier frequency, to extract only a frequency component substantially the same as the carrier frequency included in the electric signal.

31. The control method of the coordinate input apparatus according to claim 26, wherein the designation device further comprises an operation switch and a modulation controller for controlling the modulator to modulate or not modulate according to operation of the switch, and said synchronization control step comprises a detection step of detecting an operation state of the switch by determining whether or not modulation has been performed by the modulator based on a time series variance of the electric signal representing the light spot detected by the second photoreception sensor.

32. A computer-readable memory storing program codes for controlling a coordinate input apparatus which detects a position of a light spot with regard to said coordinate input apparatus, generated on a predetermined two-dimensional coordinate surface with light emitted by a designation device which emits light in a predetermined blinking cycle and outputs detected coordinate data, said memory comprising:

program codes for a first detection step of detecting from the light spot, a light emission position in two-dimensional direction, by using a first photoreception sensor;

program codes for a second detection step of detecting from the light spot, time series variance of light emitted, by using a second photoreception sensor;

program codes for a synchronization control step of synchronizing detection operation of the first photoreception sensor with the blinking cycle of light in the light spot based on the time series variance of the light spot detected by the second photoreception sensor; and program codes for a calculation step of calculating coordinates of the position of the light spot relative to said coordinate input apparatus, generated on the two-dimensional coordinate surface, based on a signal outputted from said first photoreception sensor brought to a synchronous state by said synchronization control step, wherein in said synchronization control step, each time coordinate data of the light spot for a point is processed, a light-on period start timing or end timing in the blinking cycle of light in the light spot is detected based on the time series variance of the light spot detected by the second photoreception sensor and detection operation of the first photoreception sensor is synchronized with a timing which has been deviated from the detected timing by a predetermined time period.

* * * * *